(12) United States Patent
Liu

(10) Patent No.: US 10,999,699 B2
(45) Date of Patent: May 4, 2021

(54) OBJECT LOCATING METHOD AND RELATED APPARATUS

(71) Applicant: Alibaba Group Holding Limited, Grand Cayman (KY)

(72) Inventor: Wanjun Liu, Hangzhou (CN)

(73) Assignee: Alibaba Group Holding Limited

( * ) Notice: Subject to any disclaimer, the term of this patent is extended or adjusted under 35 U.S.C. 154(b) by 0 days.

(21) Appl. No.: 16/109,574

(22) Filed: Aug. 22, 2018

(65) Prior Publication Data
US 2019/0069133 A1    Feb. 28, 2019

(30) Foreign Application Priority Data
Aug. 23, 2017   (CN) .......................... 201710733984.8

(51) Int. Cl.
*H04W 4/024*     (2018.01)
*H04W 4/021*     (2018.01)
(Continued)

(52) U.S. Cl.
CPC .......... *H04W 4/024* (2018.02); *G01C 21/206* (2013.01); *G06Q 30/0625* (2013.01);
(Continued)

(58) Field of Classification Search
CPC ............. G06Q 10/087; G06Q 30/0639; G06Q 30/0261; G07F 9/026; G06F 3/1423; H04M 3/42348
See application file for complete search history.

(56) References Cited

U.S. PATENT DOCUMENTS

| 5,722,747 A | 3/1998 | Baron |
| 7,010,498 B1 * | 3/2006 | Berstis ................. G06Q 10/087 |
| | | 705/14.36 |

(Continued)

OTHER PUBLICATIONS

The PCT Search Report and Written Opinion dated Oct. 30, 2018 for PCT Application No. PCT/US18/47594, 15 pages.

*Primary Examiner* — Dung Hong
(74) *Attorney, Agent, or Firm* — Lee & Hayes, P.C.

(57) ABSTRACT

An object locating method, wherein a server may obtain a correspondence relationship between an object and an object storage device and a correspondence relationship between an object storage device and a prompt device, and after the server receives a request for a sought target object, determining an object storage device corresponding to the target object based on a first correspondence relationship, determining a prompt device corresponding to the object storage device based on a second correspondence relationship, and transmitting a control signal to the prompt device, to control directing the prompt device to output prompt information. With the correspondence relationship between the prompt device and the object storage device reflecting the setup locations of both, after a user confirms a prompt device outputting prompt information, the location of a storage device storing the target object may be determined based on the location of the prompt device. The provided method may assist a user to quickly find a target object, improving user experience. Moreover, the present disclosure provides a related object locating apparatus, ensuring the implementation of the method in actual applications.

18 Claims, 15 Drawing Sheets

(51) Int. Cl.
  *H04W 8/00*    (2009.01)
  *G01C 21/20*   (2006.01)
  *G06Q 30/06*   (2012.01)
  *H04W 4/35*    (2018.01)
  *H04W 4/029*   (2018.01)
  *H04W 4/33*    (2018.01)

(52) U.S. Cl.
  CPC .......... *H04W 4/021* (2013.01); *H04W 4/029* (2018.02); *H04W 4/33* (2018.02); *H04W 4/35* (2018.02); *H04W 8/005* (2013.01)

(56) References Cited

U.S. PATENT DOCUMENTS

| | | | | |
|---|---|---|---|---|
| 8,155,872 | B2* | 4/2012 | Kjeldsen | G03B 21/006 |
| | | | | 701/425 |
| 9,171,281 | B1* | 10/2015 | Francis | G06Q 10/087 |
| 2003/0036985 | A1* | 2/2003 | Soderholm | G06K 17/0022 |
| | | | | 705/28 |
| 2012/0023034 | A1* | 1/2012 | Lynch | G06Q 30/06 |
| | | | | 705/346 |
| 2012/0259732 | A1* | 10/2012 | Sasankan | G01S 5/0205 |
| | | | | 705/26.9 |
| 2014/0201042 | A1* | 7/2014 | Meyer | G06Q 10/087 |
| | | | | 705/28 |
| 2014/0258028 | A1* | 9/2014 | Bynum | G06Q 90/20 |
| | | | | 705/26.8 |
| 2015/0278897 | A1* | 10/2015 | Nichols | G06Q 30/0639 |
| | | | | 705/26.41 |
| 2015/0356657 | A1* | 12/2015 | Pas | G06Q 30/0639 |
| | | | | 705/26.64 |
| 2015/0356666 | A1* | 12/2015 | Pas | G06Q 30/0639 |
| | | | | 705/26.9 |
| 2016/0225057 | A1* | 8/2016 | Pellow | G06F 16/248 |
| 2017/0061525 | A1 | 3/2017 | McCoy et al. | |
| 2017/0148077 | A1* | 5/2017 | Phillips | G06Q 10/087 |
| 2017/0178060 | A1* | 6/2017 | Schwartz | G06K 9/6267 |
| 2018/0197443 | A1* | 7/2018 | Jones | G06F 1/1632 |
| 2019/0005570 | A1* | 1/2019 | Goodman | G06F 16/90332 |
| 2019/0291954 | A1* | 9/2019 | Lee | B65G 1/137 |
| 2019/0304238 | A1* | 10/2019 | Ambauen | G07F 9/006 |

* cited by examiner

OBJECT LOCATING METHOD AND RELATED APPARATUS

CROSS REFERENCE TO RELATED PATENT APPLICATIONS

This application claims priority to Chinese Patent Application No. 201710733984.8, filed on Aug. 23, 2017 and entitled "OBJECT LOCATING METHOD AND RELATED APPARATUS", which is incorporated herein by reference in its entirety.

TECHNICAL FIELD

The present disclosure relates to the field of object locating technologies, and, more particularly, to object locating methods and related apparatuses.

BACKGROUND

A self-service store is a new kind of product that may reduce manual labor. A self-service store has minimal or no sales personnel, and customers may perform self-service activities such as self-selection and self-payment in the store. Self-service stores have greater floor space and increased product selection, and thus due to the absence of service personnel such as sales personnel, customers often need more time to find a desired product, reducing user experience quality.

Consequently, a scheme for locating objects is needed, to assist a customer to quickly find a desired product.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In view of this, the present disclosure provides an object locating method, operative to prompt the location where a sought object is present, facilitating searching by a user.

To achieve this goal, the present disclosure provides technical solutions as follows:

An aspect of the present disclosure provides an object locating method, including:

After receiving an object seeking request transmitted from a client terminal, determining a target object corresponding to the object seeking request and a target object storage device corresponding to the target object;

Determining a target prompt device corresponding to the location of the target object storage device;

Transmitting a control instruction to the target prompt device, the control instruction operative to direct the target prompt device to output prompt information based on the control instruction.

An aspect of the present disclosure provides an object locating method, including:

Receiving object information input by a user;

Transmitting the object information contained in an object seeking request to a server, the object seeking request causing the server to:

Determine a target object corresponding to the object seeking request and a target object storage device corresponding to the target object;

Determine a target prompt device corresponding to the location of the target object storage device;

Transmit a control instruction to the target prompt device, the control instruction operative to direct the target prompt device to output prompt information based on the control instruction.

An aspect of the present disclosure provides a server, including:

A processor, the processor operative to, after receiving an object seeking request transmitted by a client terminal, determine a target object corresponding to the object seeking request and a target object storage device corresponding to the target object, and determine a target prompt device corresponding to the location of the target object storage device; and A communication interface, the communication interface operative to transmit a control instruction to the target prompt device, the control instruction operative to direct the target prompt device to output prompt information based on the control instruction.

An aspect of the present disclosure provides a client terminal, comprising:

An input module, the input module operative to receive object information input by a user;

A processor, the processor operative to contain the object information in an object seeking request; and A communication interface, the communication interface operative to transmit the object seeking request to a server, wherein the object seeking request causes the server to:

Determine a target object corresponding to the object seeking request and a target object storage device corresponding to the target object;

Determine a target prompt device corresponding to the location of the target object storage device; and Transmit a control instruction to the target prompt device, the control instruction operative to direct the target prompt device to output prompt information based on the control instruction.

An aspect of the present disclosure provides an object locating room, comprising an object storage device and a prompt device;

Wherein the object storage device is operative to store objects; and

Wherein the prompt device is set up in space above the object storage device and operative to output prompt information based on a control instruction.

An aspect of the present disclosure provides an object locating room, comprising an object storage device and a prompt device;

Wherein the object storage device is operative to store objects; and

Wherein the prompt device is set up on interior surfaces of the object locating room in a region corresponding to the location of the object storage device, and operative to output prompt information based on a control instruction.

An aspect of the present invention provides an object locating system, comprising a server, an object storage device, and a prompt device;

Wherein the object storage device is operative to store objects;

Wherein the server is operative to, after receiving an object seeking request transmitted by a client terminal, determine a target object corresponding to the object seeking request and an object storage device corresponding to the target object; determine a prompt device corresponding to the location of the object storage device; and transmit a control instruction to the prompt device; and Wherein the prompt device is set up in a location corresponding to the object storage device, and operative to output prompt information based on the control instruction.

As shown by the above technical solutions, the present disclosure provides an object locating method, wherein after a server receives a request seeking a target object, the server determines an object storage device corresponding to the target object and determines a prompt device corresponding to the location of the object storage device, then transmits a control instruction to the prompt device, directing the prompt device to output prompt information. Since a correspondence relationship between the prompt device and the object storage device reflects the setup locations of both, after the user confirms the prompt device that output the prompt information, the user may further determine the location of the object storage device storing the target object based on the location of the prompt device. This method may assist a user to quickly find the target object, improving user experience.

BRIEF DESCRIPTION OF THE DRAWINGS

To describe the technical solutions in the example embodiments of the present disclosure more clearly, the following briefly introduces the accompanying drawings describing the example embodiments. It will be apparent that the accompanying drawings described in the following merely represent some example embodiments described in the present disclosure, and those of ordinary skill in the art may still derive other drawings from these accompanying drawings without creative efforts.

DETAILED DESCRIPTION

In order to enable those skilled in the art to better understand the technical solutions in the present disclosure, the technical solutions in the example embodiments of the present disclosure will be described clearly and completely through the accompanying drawings in the example embodiments of the present disclosure. It will be apparent that the described example embodiments represent merely some of example embodiments of the present disclosure, rather than all the example embodiments. Based on the example embodiments of the present disclosure, all other example embodiments derived by those of ordinary skill in the art without any creative effort shall fall within the protection scope of the present disclosure.

A self-service store usually has a larger floor space and has a relatively large number of products, and customers often need more time to find a desired product. To assist a customer to quickly find a desired product, the present disclosure provides an object locating method.

The object locating method is not only applicable to locating objects in a self-service store, but also applicable to other settings, such as assisting stocking personnel to quickly locate particular goods within a warehouse. As long as many objects are stored in some particular region of space, the method provided by the present scheme may be applied to quickly locate a target object desired to be found.

Figure 1:
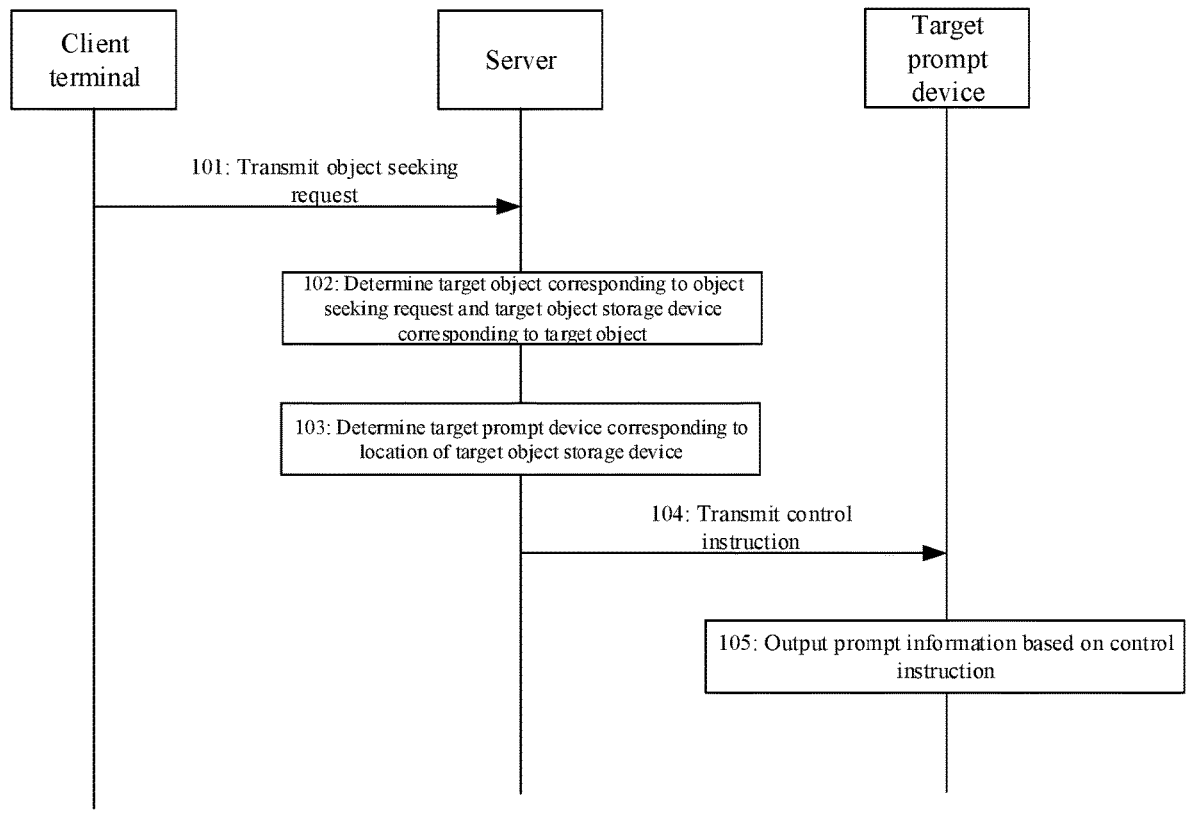
FIG. 1 is a flowchart of an object locating method according to an example embodiment provided by the present disclosure.

FIG. 1 is a flowchart of an object locating method according to an example embodiment provided by the present disclosure. As illustrated by FIG. 1, the flowchart in particular includes steps 101 to 105.

In step 101, a client terminal transmits an object seeking request to a server.

Herein, a client terminal may be a handheld portable client terminal, such as a mobile phone, laptop computer and the like, or may be a self-service terminal having a fixed location. If the client terminal is a portable client terminal, a user may input object information from any location, without limitation to a fixed location. Thus, a portable client terminal may improve convenience for a user inputting object information, thereby improving user experience.

In particular, a user may input text, voice, video and such various types of object information into the client terminal; for ease of description, the following may designate a sought object as a target object. Taking voice as an example, a voice collection module may be set up at a client terminal, and a user may input the sought object information into the client terminal through the voice collection module.

In practical applications, to improve the success rate of the user finding objects, object groups contained in the region of space may be transmitted to the client terminal and displayed in advance, and the user may select objects of a particular group as target objects. Object groups may be classified based on situational requirements, and classified object groups may be broad-ranging object groups or narrow-ranging object groups. For example, object groups may include "food," or, more narrowly, object groups may include "instant noodles" and "chocolate," or, more narrowly, object groups may include "Master Kong instant noodles," "Uni-President instant noodles," "Baixiang instant noodles," "Dove chocolates," and "Ferrero chocolates."

Particular classification standards may be set based on situational requirements, not to be limited by the present disclosure.

After the client terminal receives sought object information input by the user, the object information, contained in an object seeking request, is transmitted to the server.

In step 102, the server determines a target object corresponding to the object seeking request and a target object storage device corresponding to the target object.

Herein, after receiving an object seeking request transmitted by a client terminal, the server may determine the target object sought by the user based on the object seeking query. In particular, one or more object storage devices may be set up within a region of space, objects being stored within the object storage devices. Correspondence relationships between objects and object storage devices may be recorded in advance, where a correspondence relationship may represent each object contained in a region of space and which one or more object storage devices each respective object has been placed in.

The above-mentioned correspondence relationship may include a correspondence relationship between a single object and an object storage device, i.e., a record of which object storage device each object is respectively at. However, in practical applications, an object that a user desires to find is often not specifically a particular object, but rather a particular kind of product; for example, if the user desires to find "Master Kong instant noodles," the correspondence relationship may include a correspondence relationship between an object group and an object storage location.

Taking a self-service store as an example, six shelves are set up in a self-service store, containing 500 types of products. Each shelf has its own unique shelf designation; suppose that shelf designations range from A to F. Each product has its own unique product designation; suppose that product designations range from 001 to 500. Thus a correspondence relationship between product designations and shelf designations may be recorded, the correspondence relationship being operative to represent that the product is placed on the shelf.

Figure 2:
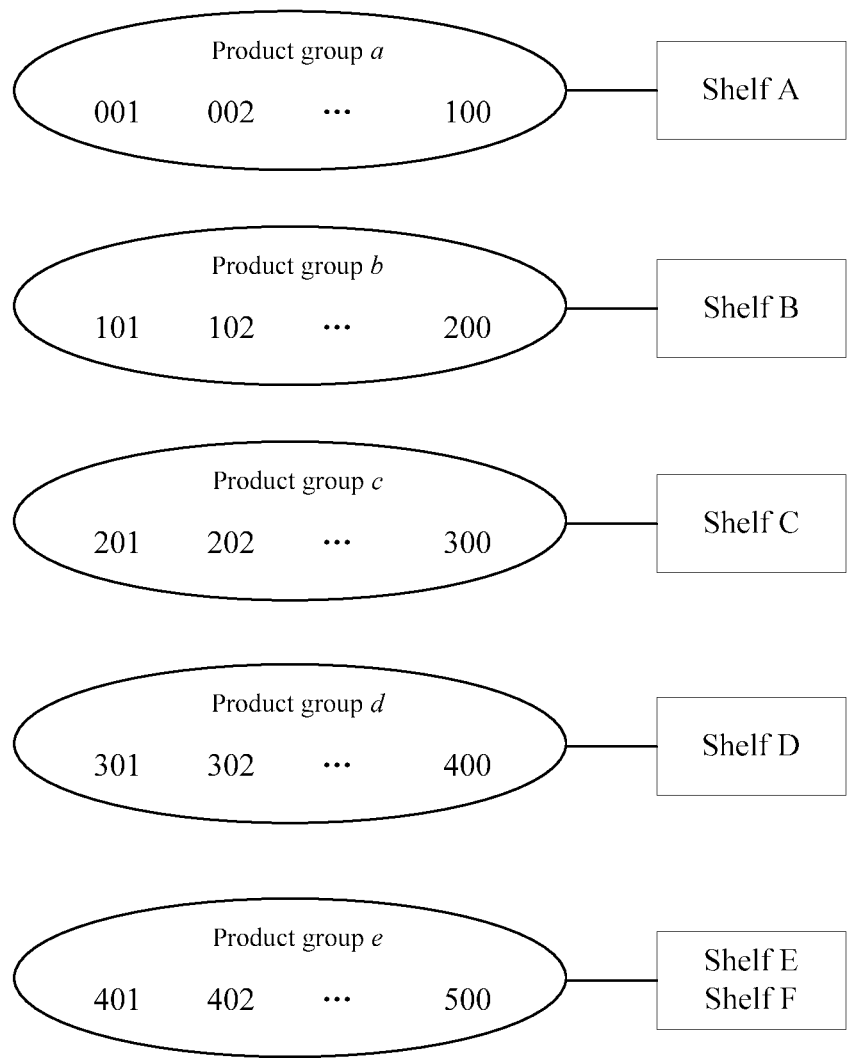
FIG. 2 is a diagram of correspondence relationships between products and shelves according to an example embodiment provided by the present disclosure.

Suppose that as illustrated by FIG. 2, product designations 011 to 100 serve constitute product group a, product designations 101 to 200 constitute product group b, product designations 201 to 300 constitute product group c, product designations 301 to 400 constitute product group d, and product designations 401 to 500 constitute product group e. Further suppose that products of product designations 001 to 100 are placed on shelf A, products of product designations 101 to 200 are placed on shelf B, products of product designations 201 to 300 are placed on shelf C, products of product designations 301 to 400 are placed on shelf D, and products of product designations 401 to 500 are placed on shelf E and shelf F. Thus, not only a correspondence relationship between a single product and a shelf, but also a correspondence relationship between a product group and a shelf may be recorded.

It may be seen that correspondence relationships between products and product storage devices may include multiple thereof, the multiple correspondence relationships having levels, and the level of a correspondence relationship may be reflected by the classification level of a target object. A correspondence relationship may enable a server to operate to determine an object storage device corresponding to an object.

In particular, after a server receives an object seeking request, object information is extracted from the object seeking request. Recognition is performed upon the object information, to determine which group of target object corresponds to the object information. For example, the received object information is "Master Kong instant noodles," and if objects of the correspondence relationship contain "Master Kong instant noodles," then the target object may be directly determined as "Master Kong instant noodles"; if objects of the correspondence relationship do not contain "Master Kong instant noodles," but do contain a product in a higher-level range thereto, "instant noodles," then "instant noodles" may be determined as the target object. Above-mentioned object information recognition techniques may be others, details thereof not being repeated herein.

After a server determines a target object, among correspondence relationships between objects and object storage devices, an object storage device corresponding to the target object is searched for. For ease of description, an object storage device that has been found may be referred to as a target object storage device. For example, the sought target object is product group c; based on the examples illustrated in FIG. 2 it is known that the object storage device corresponding to product group c is shelf C, so shelf C may be determined as the target object storage device.

In step 103, the server determines a target prompt device corresponding to the location of the target object storage device.

Herein, within the region of space where the object storage device is present, a prompt device is further set up. A correspondence relationship exists between a prompt device and an object storage device, the correspondence relationship reflecting that there is a correspondence relationship between the location of the prompt device and the location of the object storage device. The correspondence relationship, with regard to a user, has a navigation functionality, so that after the user confirms the location of the prompt device, the location of the object storage device may be determined based on the location of the prompt device.

Figure 3:
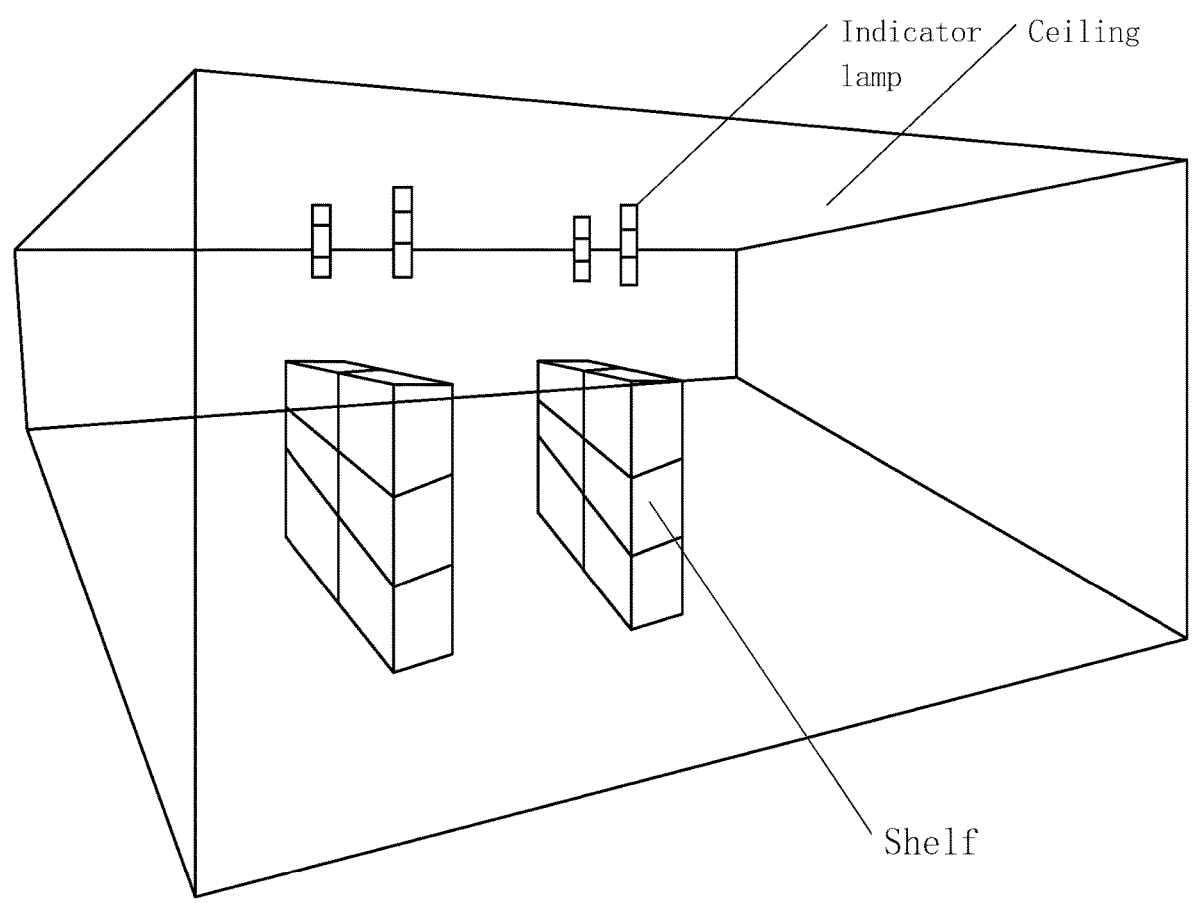
FIG. 3 is a diagram of a structure of a self-service store according to an example embodiment provided by the present disclosure.

For example, as illustrated by FIG. 3, in a self-service store, a prompt device is an indicator lamp, an object storage device is a shelf, and the indicator lamp is set up on the ceiling above the shelf. An indicator lamp may have a tube lamp form as illustrated in FIG. 3, suspended perpendicular to the ceiling; or, an indicator lamp may have a flat form, being embedded in the ceiling, and part of the same plane as the ceiling. Thus, after a user determines some indicator lamp that is lit, a shelf below the indicator lamp may be taken as a target shelf. A setup location of a prompt device is not limited to above an object storage device, but may also be to other directions, as long as a correspondence relationship exists.

With regard to a setup location, a correspondence relationship exists between a prompt device and an object storage device. The correspondence relationship between the prompt device and the object storage device may be recorded; for example, a recorded correspondence relationship may include: a relationship between indicator lamp AA and shelf A, a relationship between indicator lamp BB and shelf B, a relationship between indicator lamp CC and shelf C, . . . , a relationship between indicator lamp FF and shelf F.

After a target object storage device corresponding to a target object is determined at step 102, among correspondence relationships as above, a prompt device corresponding to the target object storage device is searched for. For ease of description, a prompt device that has been found may be referred to as a target prompt device. Suppose that shelf C is determined as the target storage device; based on the above correspondence relationship, it may be determined that indicator lamp CC corresponds to shelf C, such that indicator lamp CC is the target prompt device.

Prompt devices are not limited to indicator lamps, and may be devices of any form capable of prompting, such as for example devices capable of performing audio prompting such as speakers.

In step 104, the server transmits a control instruction to the target prompt device.

Herein, after the server determines the target prompt device, it may then transmit a control instruction to the target prompt device, the control instruction being operative to direct the target prompt device to output prompt information based on the control instruction. The format of the control instruction corresponds to the form of the prompt device. For example, when the prompt device is an indicator lamp, the control instruction is operative to control directing a lamp to emit light; when the prompt device is a speaker, the control instruction is operative to control a speaker to produce sound.

In step 105, the target prompt device outputs prompt information based on the control instruction.

Herein, after the target prompt device receives a control instruction, it outputs prompt information according to the control instruction. The target prompt device may be set up in a region of space, and prompt information may be prompt information visible to a user within an effective region of the region of space. A region of space may include various regions not belonging to the applicable setting, and users within these regions may not need to see prompt information, while regions outside these regions are regions related to the applicable setting, which, for ease of description, may be referred to as an effective region; prompt information may be prompt information that is visible to a user within the effective region.

For example, when a target prompt device is set up in a self-service store, the self-service store may include a warehouse object region, a stocking region, and such regions not related to a product purchase setting, but a self-service store also includes regions where in-stock products are present, customer activity regions, and such effective regions; prompt information may be prompt information visible to users within these effective regions.

To achieve improved navigation, prompt information maximally covers effective regions. Thereby, a user need only enter an effective region of the region of space, and then may see prompt information and may quickly locate the locations of desired objects through the prompt information. Prompt devices may be light fixtures, such that prompt information may be light information. Light information may be illumination such as sunlight, or may be directed light such as laser light.

Based on prompt information, a user may quickly locate objects desired to be found. For example, when the target prompt device is indicator lamp CC, the control signal is operative to direct indicator lamp to emit light, so that the user within the self-service store sees the lit indicator lamp and may determine that the sought product is on the shelf under the lit indicator lamp, so as to quickly locate the location of the sought product.

By the above technical solution it may be known that, by the object locating methods of the present disclosure, a server may obtain a correspondence relationship between an object and an object storage device and a correspondence relationship between the object storage device and a prompt device, and, after the server receives a request seeking a target object, the server determines an object storage device corresponding to the target object based on a first correspondence relationship, and determines a prompt device corresponding to the object storage device based on a second correspondence relationship, and furthermore transmits a control instruction to the prompt device, directing the prompt device to output prompt information. Since a correspondence relationship between the prompt device and the object storage device reflects the setup locations of both, after the user confirms the prompt device that output the prompt information, the user may further determine the location of the object storage device storing the target object based on the location of the prompt device. This method may assist a user to quickly find the target object, improving user experience.

In practical applications, an object storage device may include various storage regions, and a user may be able to determine that a sought target object is in an object storage device based on the prompt of a prompt device, but not determine which storage region of the object storage device. For example, in a self-service store, a user finds that a target shelf is shelf C based on an indicator lamp, but shelf C has three levels, and a user must still successively search for the target object on each level of the shelf; search efficiency may be yet further improved.

Therefore, in order to further improve the efficiency of searching for objects, the correspondence relationship between the prompt device and the object storage device may be set as a correspondence relationship between the prompt device and a storage region. When determining a target prompt device, first it is determined which storage region is the storage region corresponding to the target object; for ease of description, the determined storage region may be referred to as a target storage region; then, the prompt device corresponding to the target storage region is determined as the target prompt device. After transmitting a control instruction to the target prompt device, the target prompt device outputs prompt information that may assist the user to quickly locate the storage region where the target object is present.

In particular, by an implementation, a prompt device is set up in space above an object storage device, the prompt device including a prompt unit corresponding to a storage region; by this particular embodiment of a correspondence relationship, the location of the prompt unit may represent the location of the storage region.

For example, as illustrated by FIG. 3, the object storage device is a shelf including three levels of shelf units, the prompt device is an indicator lamp suspended perpendicular to the ceiling above the shelf, and the indicator lamp includes three lamp segments from top to bottom. The number of lamp segments is the same as the number of shelves, the layers of shelf units are distributed vertically over the entire shelf, and each lamp segment is distributed vertically over the entire indicator lamp, and thus it can be known that there is a correspondence relationship in manner of setup between a lamp segment and a shelf unit. Thereby, if the first lamp segment from top to bottom lights, this represents the target object being located on the first shelf unit from top to bottom; if the second lamp segment from top to bottom lights, this represents the target object being located on the second shelf unit from top to bottom; and if the third lamp segment from top to bottom lights, this represents the target object being located on the third shelf unit from top to bottom. For more convenient reference by a user, a designation of a shelf unit may be displayed at the same time of lighting; the designation of shelf units may be numerical designations such as 1, 2, 3, and so on.

By the above implementation, when the target prompt device is determined, the prompt unit corresponding to the storage region where the target object is present is determined as the target prompt device, and furthermore the control instruction controls the prompt unit corresponding to the storage region where the target object is present to output prompt information. For example, the storage region where the target object is present is the first shelf unit from top to bottom, so the control instruction controls the first lamp segment from top to bottom to light.

Figure 4:
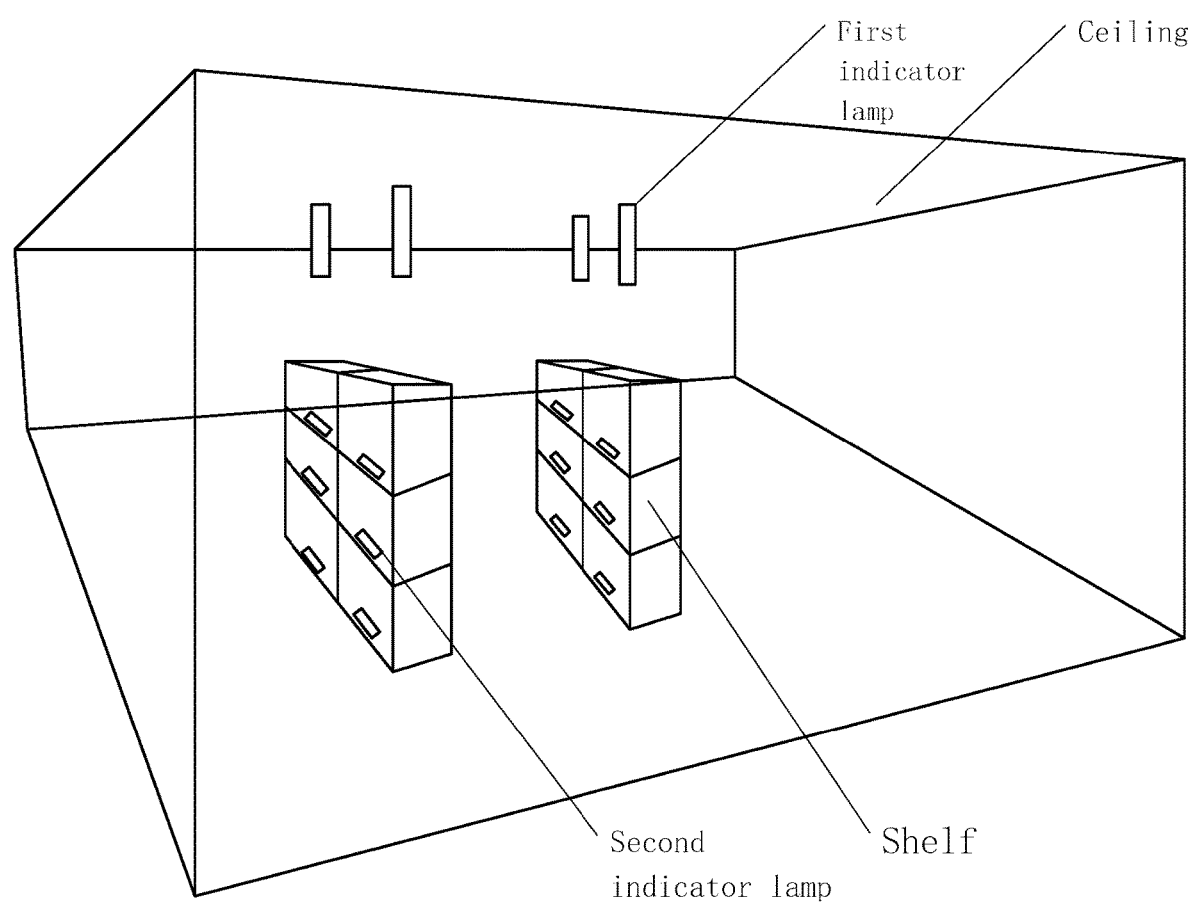
FIG. 4 is a diagram of another structure of a self-service store according to an example embodiment provided by the present disclosure.

By another implementation, a first prompt unit is set up in space above the object storage device, the object storage device including a plurality of storage regions, and a second prompt unit is set up at the location of the storage region. For example, as illustrated by FIG. 4, the object storage device is a shelf including three levels of shelf units, and the prompt device includes a first indicator lamp and a second indicator lamp; herein, the first indicator lamp is suspended perpendicular from the ceiling above the shelf, and the second indicator lamp is set up at a shelf unit. Thereby, not only does the first indicator lamp above the shelf light, but the second indicator lamp at the location of the shelf unit also lights, and the user may directly determine which shelf unit the target object is on based on the lit second indicator lamp.

By the above implementation, when the target prompt device is determined, the first prompt unit corresponding to the object storage device and the second prompt unit corresponding to the storage region are determined as target prompt devices, and furthermore the control instruction not only may control the first prompt unit to output prompt information, but also may control the second prompt unit to output prompt information. For example, the storage region where the target object is present is the first shelf unit from top to bottom of shelf C, so the control instruction not only controls the indicator lamp above shelf C to light, but also controls the indicator lamp of the first shelf unit from top to bottom of shelf C to light.

Of course, the correspondence relationship between the storage region and the prompt device may be yet other formats, not to be limited to the above two kinds.

The above technical solutions may set up corresponding prompt devices for storage regions, and through prompt devices corresponding to storage regions, the storage region where a target object is present may be quickly determined.

In practical applications, another situation is that a region of space where object storage devices are present includes multiple object storage devices, each object storage device having respective corresponding prompt devices; if multiple users transmit object seeking requests through client terminals, the server may transmit control instructions to multiple prompt devices at the same time, causing multiple prompt devices to output prompt information at the same time. If multiple prompt devices output the same prompt information, this will lead to users being unable to distinguish which prompt device outputting prompt information corresponds to themselves.

To solve the above-mentioned problem, the present disclosure may set up respective corresponding prompt information for each object storage device, different prompt information corresponding to different object storage devices. Users may, through client terminals, learn which prompt information should be output by the object storage device where their own objects desired to be found are present, and then, among prompt devices, find the prompt device outputting such prompt information.

Figure 5:
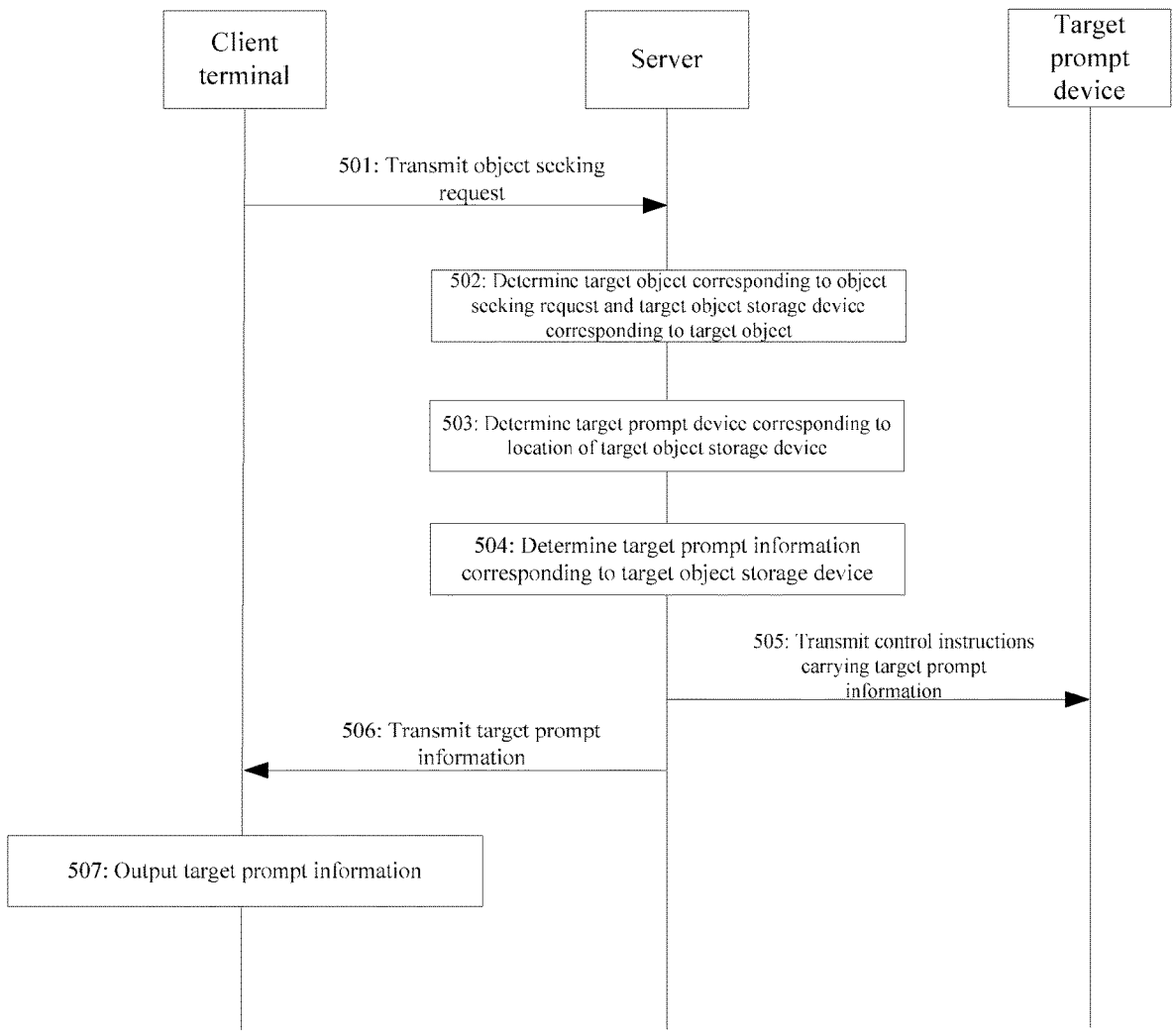
FIG. 5 is another flowchart of an object locating method according to an example embodiment of the present disclosure.

In particular, FIG. 5 illustrates another flowchart of an object locating method. Therein, steps 501 to 503 are the same as steps 101 to 103 above, and shall not be repeated here; below, steps 504 to 507 are described in particular.

In step 504, the server determines target prompt information corresponding to the target object storage device.

Herein, a default correspondence relationship exists between object storage devices and prompt information. For example, prompt devices being indicator lamps, and object storage devices being shelves, prompt information corresponding to shelf A is colored red, prompt information corresponding to shelf B is colored green, prompt information corresponding to shelf C is colored yellow, prompt information corresponding to shelf D is colored green, and so on.

After determining a target object storage device, based on a correspondence relationship, prompt information corresponding to the target object storage device may be determined. For ease of description, the determined prompt information may be referred to as target prompt information. For example, a target storage device is shelf C, and based on the above-mentioned correspondence relationship example it may be determined that the target prompt information is colored yellow.

In step 505, the server transmits a control instruction carrying target prompt information to the target prompt device, the control instruction operative to direct the target prompt device to output the target prompt information.

Herein, when the server transmits the control instruction to the target prompt device, target prompt information needs to be carried, so that the target prompt device outputs the prompt information. For example, the control instruction may carry a yellow instruction, so that the indicator lamp emits yellow light.

In step 506, the server transmits the target prompt information to the client terminal.

In step 507, the client terminal outputs the target prompt information.

Herein, after the client terminal receives the target prompt information, it outputs the target prompt information. The user, based on the target prompt information, may confirm the nature of the prompt information output by the prompt device corresponding to the sought object, so as to be able to find the prompt device outputting the target prompt information among prompt devices.

Still taking the above example as an example, suppose that the prompt information corresponding to the shelf where the target object is present is colored yellow, the server transmits to the client terminal information related to the color yellow, such as yellow-colored text or the color yellow, and the user, through the user terminal, may determine that the prompt information corresponding to the shelf where the target object is present is colored yellow, so that the user searches for an indicator lamp emitting yellow light.

By the above technical solutions, different prompt information may be set up for different object storage devices; if object storage devices sought by multiple users are not all the same, users may determine, based on prompt information output by a client terminal, the nature of the prompt information they themselves desire to find, and find the prompt device outputting the target prompt information among prompt devices, the object storage device corresponding to the prompt device being the storage device where the target object they desire to find is present.

Figure 6:
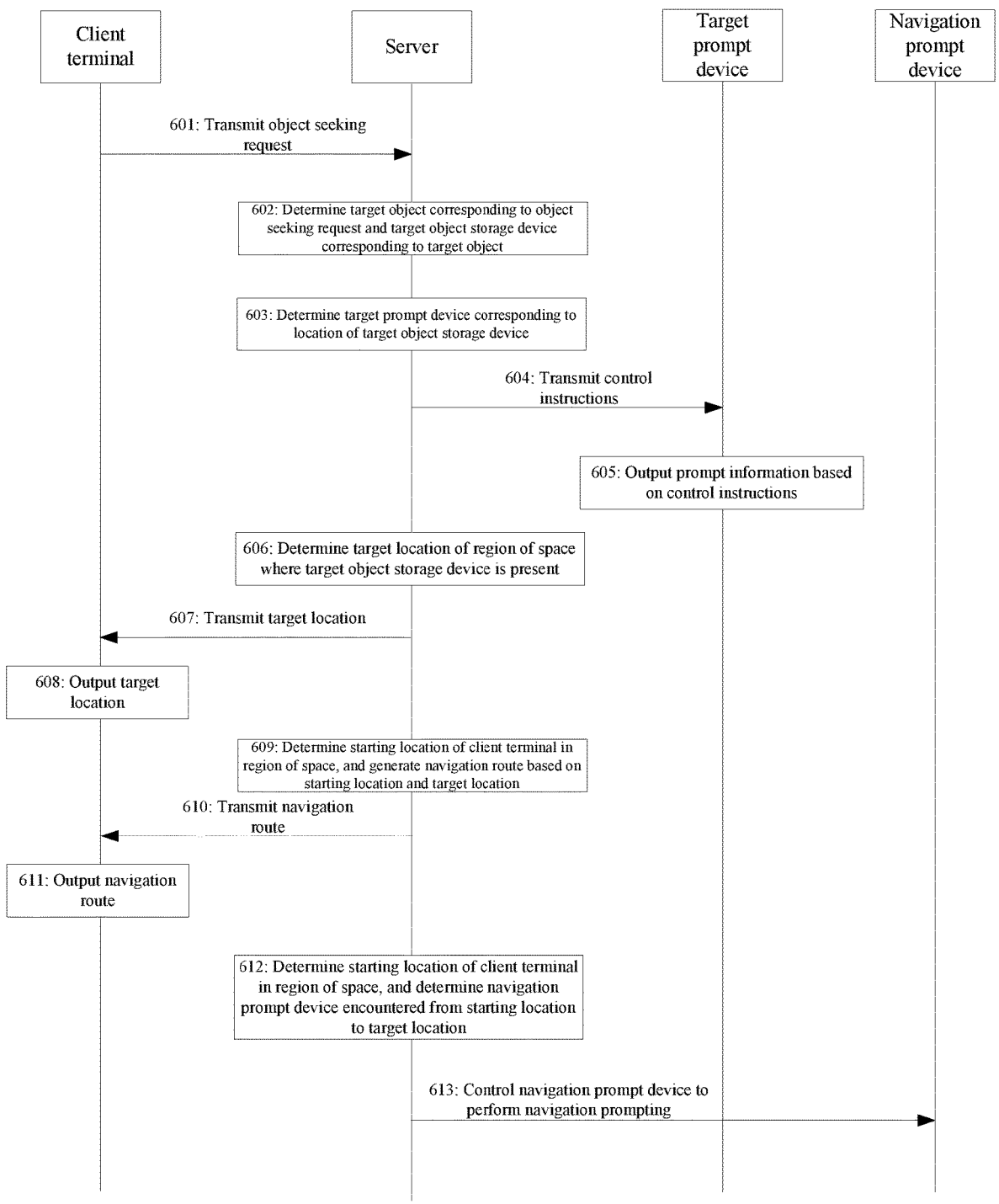
FIG. 6 is another flowchart of an object locating method according to an example embodiment provided by the present disclosure.

To further improve the efficiency of finding objects, the client terminal may display various navigation information to the user, to guide the user to quickly find the location where the target object is present. FIG. 6 illustrates another flowchart of an object locating method according to the present disclosure. Herein, steps 601 to 605 are the same as steps 101 to 105 above, and shall not be repeated herein; below, steps 606 to 613 are described.

In step 606, the server determines a target location of the region of space where the target object storage device is present.

Herein, the region of space where the object storage device is present has a layout, and the server may mark the location where the object storage device is present on the layout; for ease of description, the location may be referred to as the target location. Of course, the format of a target location is not limited to a location on a layout, but may also be other formats, such as text, voice and the like.

In step 607, the server transmits the target location to the client terminal.

In step 608, the client terminal outputs the target location.

Figure 7:
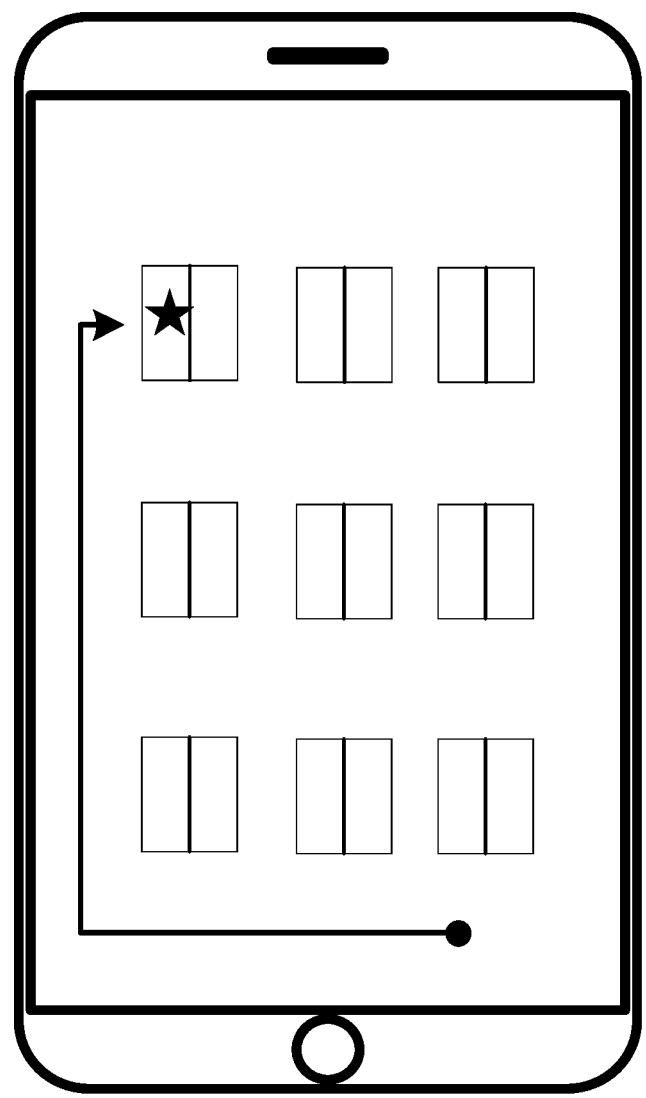
FIG. 7 is a diagram of a navigation route displayed by a client terminal according to an example embodiment of the present disclosure.

Herein, the client terminal, based on the format of the target location, outputs the target location according to the format of the target location. For example, the target location is text, and the client terminal displays the text of the target location; as illustrated by FIG. 7, the target location is the location on the layout marked by a star, and the client terminal displays a layout having a marked location. The target location is a location where the object sought by the user is present; based on the target location output by the client terminal, the user may confirm the location of the sought object in the region of space.

In step 609, the server determines that the client terminal is at a starting location of the region of space, and based on the starting location generates a navigation route to the target location.

Herein, the server determines the location of the client terminal at the time of transmitting the object seeking request, the location being the starting location of the client terminal, the starting location of the client terminal being also the starting location of the user. The server generates a navigation route based on the starting location of the client terminal and the target location where the sought object is present.

In step 610, the server transmits the navigation route to the client terminal.

In step 611, the client terminal outputs the navigation route.

As illustrated by FIG. 7, the client terminal displays a navigation route, wherein the dot represents the starting point of the navigation route, and the location of the star represents the endpoint of the navigation route. The navigation route displayed by the client terminal may guide the user from the starting location to the target location where the sought object is present.

The target location and the navigation route may be separately or may be together transmitted to the client terminal, and the client terminal may separately or may together display the target location and the navigation route. Additionally, in practical applications, example implementations may exclusively include step 606 to step 608, used to transmit the target location to the client terminal; or may exclusively include step 609 to step 611, used to transmit the navigation route to the client terminal. In other words, the target location and the navigation route may not both be transmitted to the same client terminal.

In step 612, the server determines the starting location of the client terminal within the region of space, and determines a navigation prompt device encountered from the startling location to the target location.

Figure 8:
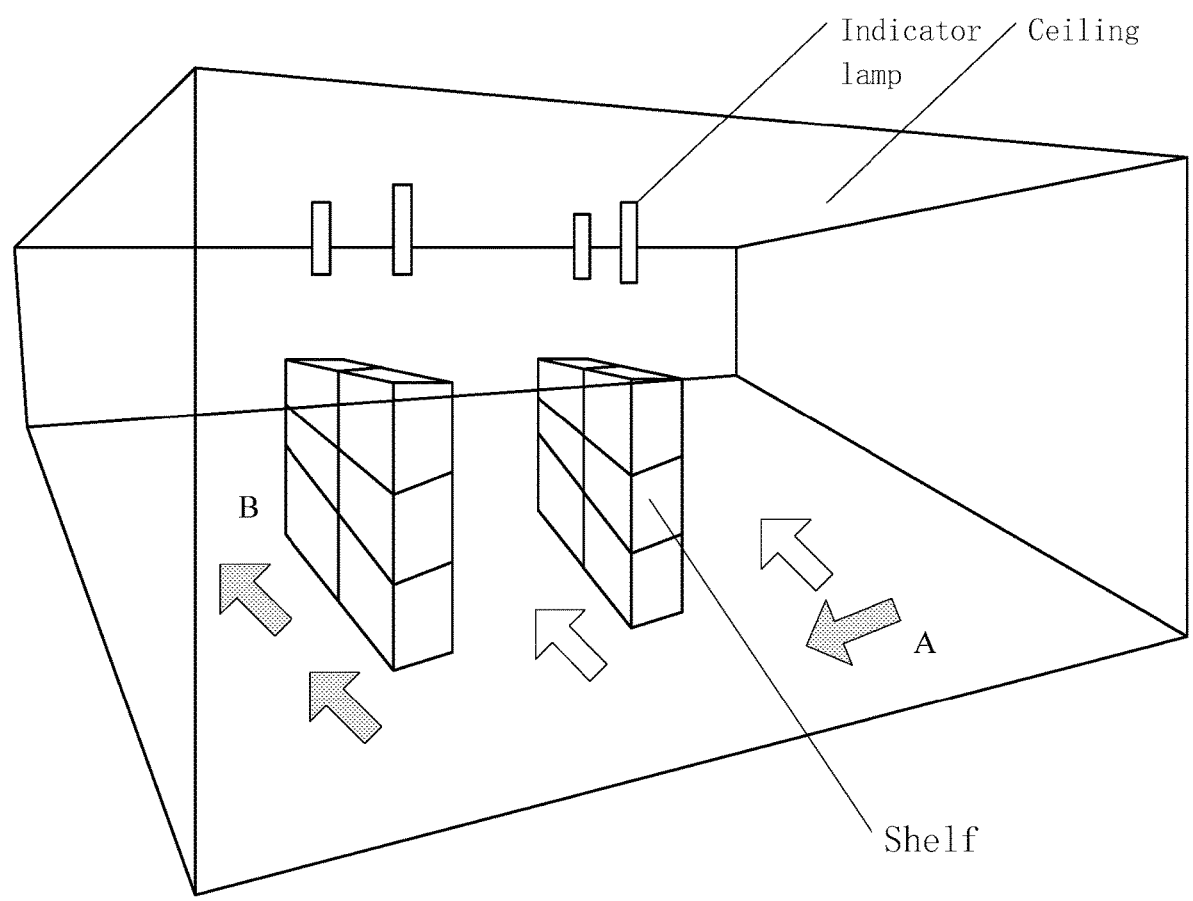
FIG. 8 is diagram of another structure of a self-service store according to an example embodiment of the present disclosure.

Herein, a navigation prompt device may be set up in the region of space, and the navigation prompt device may guide a user from a location to another location. As illustrated by FIG. 8, arrow indicator lamps may be set up in floors of the self-service store, the directions of the arrows representing direction of travel in routes.

Thus, in determining the starting location of the client terminal and the target location where the sought object is present, navigation prompt devices encountered on the route from the starting location to the target location are determined. As illustrated by FIG. 8, the location where the user was present at the time of using the client terminal to transmit an object seeking request is point A, the sought object is located at point B, and the server may determine that three navigation prompt devices encountered are from point A to point B, the three navigation prompt devices being the navigation prompt devices illustrated as filled in in grey.

In step 613, the server controls the navigation prompt device to perform navigation prompting.

Herein, the server may transmit a navigation instruction to the navigation prompt device, the navigation instruction operative to control the navigation prompt device to turn on, and the navigation prompt device, after turning on, may perform navigation prompting according to a default manner. For example, the navigation prompt device is an arrow indicator lamp, such that the server transmits a turning on instruction to the navigation prompt device determined in step 612, controlling the arrow indicator lamp to light, and the lit arrow indicator lamp may point a direction of travel for the user.

It is not mandatory to execute step 612 and step 613, i.e., the user may perform navigation without using a navigation prompt device.

To summarize, the present disclosure provides multiple types of solutions to assist users to quickly reach a target location: including, but not limited to, transmitting a target location to a client terminal, transmitting a navigation route to a client terminal and performing prompting using a navigation prompt device. The multiple types of solutions may all be executed in a single instance of an object locating method, or any one or combination of a plurality thereof may be executed.

Figure 9:
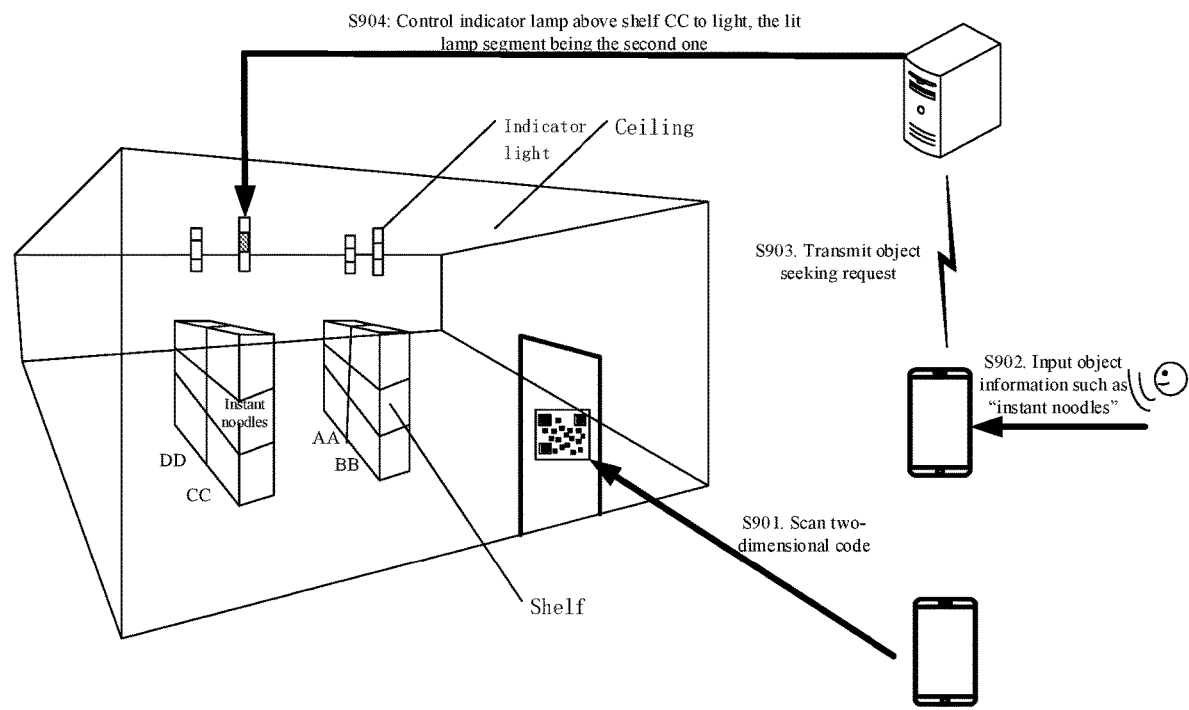
FIG. 9 is a flowchart of an object locating method applied to a self-service store setting according to an example embodiment of the present disclosure.

To assist understanding, the present disclosure combines a self-service store as illustrated by FIG. 9 with an example of an applicable setting to describe the implementation process of the object locating method.

As illustrated by FIG. 9, two-dimensional codes for user login to the server may be set up at various locations in a self-service store, such as store doorways. At the illustrated step 901, after a user uses a client terminal to scan a two-dimensional code, the client terminal may connect to the server controlling the self-service store, in order to utilize an object locating method provided by the server. Of course, a scannable code for user login to the server is not limited to two-dimensional codes, and may be other formats.

After the client terminal connects to the server, the user may input information of an object desired to be found into the client terminal. At the illustrated step 902, the user inputs object information into the client terminal in a voice format; suppose that the user inputs "instant noodles." At the illustrated step 903, the client terminal transmits the input object information, contained in an object seeking request, to the server.

As illustrated by FIG. 9, multiple shelves are set up in a self-service store, an indicator lamp being set up perpendicularly from the ceiling above each shelf. A shelf includes multiple levels, and an indicator lamp includes a corresponding number of lamp segments. The server determines the target object the user desires to find based on the object seeking request, and determines the target shelf where the target object is present as well as which level of the target shelf. Suppose the target shelf is shelf CC and the second level of shelf CC. At the illustrated step 904, the server controls an indicator lamp above shelf CC to light, the lit lamp segment being the second one. Thereby, the user may determine that the target object is on the second level of shelf CC based on the indicator lamp.

Alternatively, the server may further set up different prompt colors for different shelves in advance. After a server determines a target shelf, the server may, based on a correspondence relationship set up in advance, determine the target prompt color corresponding to the target shelf, and the server controls the indicator lamp above the target shelf to light in the target prompt color. The server transmits information related to the target prompt color to the client terminal, so that the user may confirm which color of indicator lamp to search for.

For example, the prompt color corresponding to shelf CC is yellow, such that the server controls the second lamp segment above shelf CC to light in a yellow color. Additionally, the server transmits a yellow display command to the client terminal, and the client terminal displays a yellow indicator lamp.

Alternatively, after a client terminal connects to the server, the server may further record the connected client terminal, such as by recording a login account, a mobile phone identifier, and so on. After the server determines the target shelf, the layout of the self-service store and the location of the target shelf on the layout may be transmitted to the above-mentioned recorded client terminal. The client terminal may display the layout, with a marked point representing the location of the target shelf. The layout displayed by the client terminal and the marked point on the layout may further assist in quickly finding the sought target object.

Alternatively, the server further may obtain the starting location of the client terminal, and on the layout transmitted to the client terminal, may include a navigation route from the starting location to the target location. A dotted line displayed by the client terminal represents the navigation route. Based on the navigation route, the user may more quickly arrive at the target location where the target object is present.

Alternatively, arrow indicator lamps are further installed in the floor of the self-service store, and the server may determine the arrow indicator lamps encountered on the navigation route based on the navigation route, then light the arrow indicator lamps. A user, based on the prompts of the arrow indicator lamps, may quickly find the target object. Of course, in order to respond to multiple client terminals seeking at the same time, prompt colors of arrow indicator lamps may be set up based on the color of the target prompt device, in accordance with the above-mentioned handling process for target prompt devices.

The present disclosure provides an object locating room, including object storage devices and prompt devices; wherein, object storage devices are used to store objects; and the prompt devices are installed in space above the object storage devices, and are used in accordance with control instructions to output prompt information.

Alternatively, the present disclosure also provides another object locating room, including object storage devices and prompt devices; wherein, object storage devices are used to store objects; and the prompt devices are installed on the interior surface of the object locating room at regions corresponding to the locations of object storage devices, and are used in accordance with control instructions to output prompt information. Herein, directions of a control instruction may be in reference to the above-mentioned disclosure, which shall not be repeated here.

Summarizing the teachings of the above disclosure, a specific example of an object locating room is a self-service store, where prompt devices may be lamps, and lamps may be installed on the interior surfaces of the object-locating room, and in particular interior surfaces of the object locating room may have an installed ceiling, and the lamps may be secured on the ceiling.

Figure 10A:
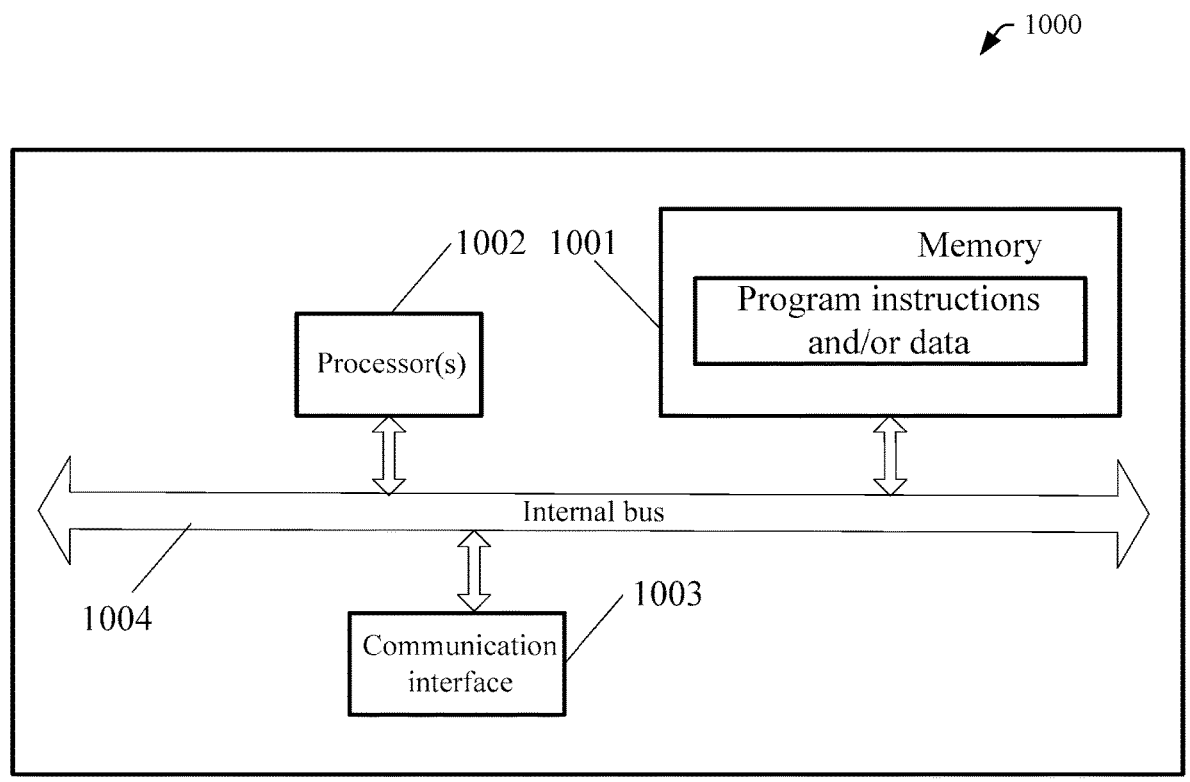
FIGS. 10A and 10B are diagrams of a structure of a server according to an example embodiment of the present disclosure.
Figure 10B:
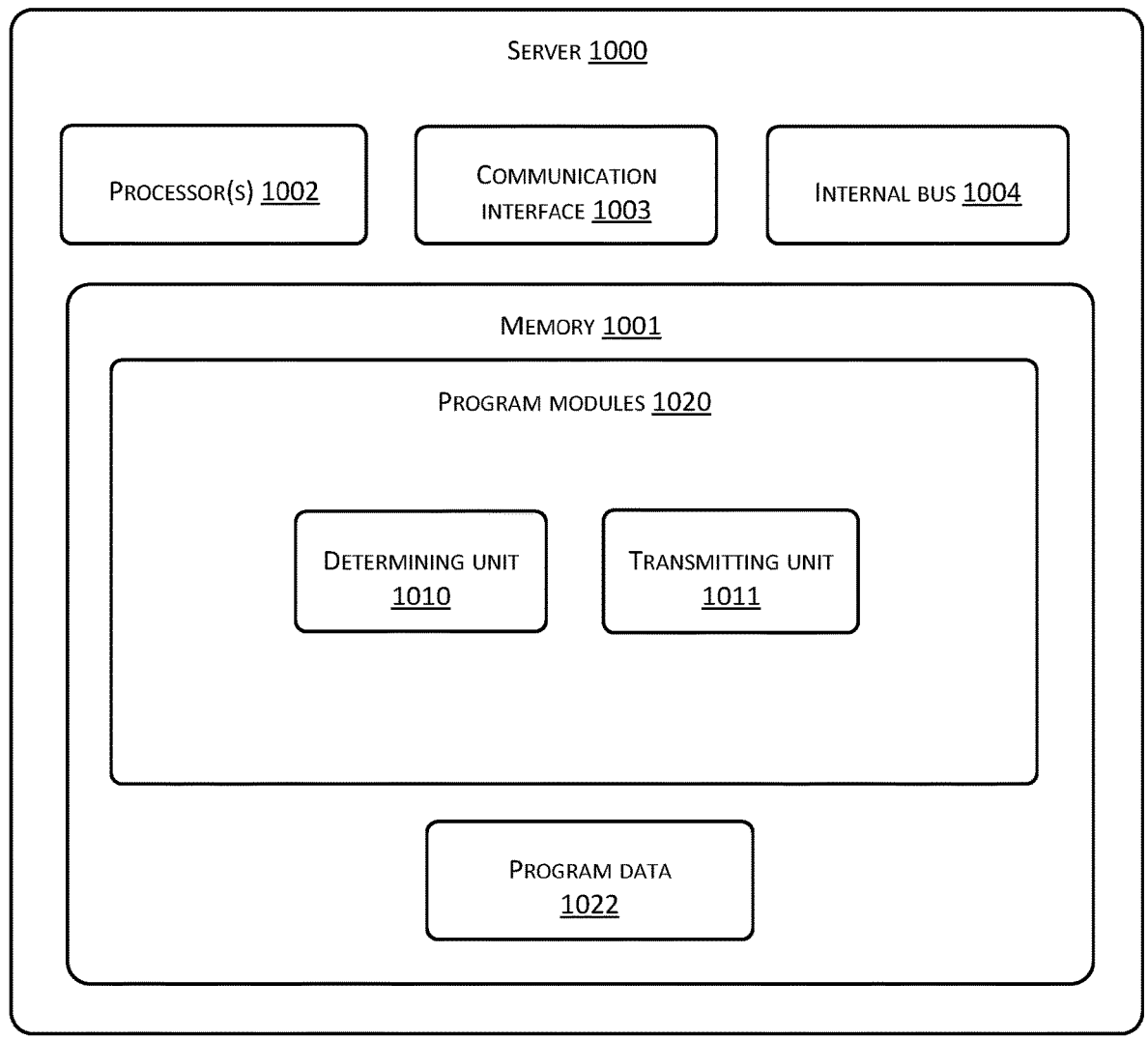

Referring to FIGS. 10A and 10B, a schematic of a server 1000 of example embodiments of the present disclosure is illustrated. As illustrated by FIGS. 10A and 10B, the server 1000 may in particular include: memory 1001, one or more processors 1002, communication interface 1003, and internal bus 1004. The server 1000 may further include a determining unit 1010 and a transmitting unit 1011.

Memory 1001 is operative to store program instructions and/or data.

One or more processors 1002, through reading program instructions and/or data stored on memory 1001, is operative to execute processes as follows:

The determining unit 1010 is stored in the memory 1001 and executable by the one or more processors 1002 to cause the one or more processors 1002 to, after receiving an object seeking request transmitted by a client terminal, determine a target object corresponding to the object seeking request and a target object storage device corresponding to the target object.

The determining unit 1010 further executable by the one or more processors 1002 to cause the one or more processors 1002 to determine a target prompt device corresponding to the location of the target object storage device.

The transmitting unit 1011 is stored in the memory 1001 and executable by the one or more processors 1002 to cause the communication interface 1003 to transmit a control instruction to the target prompt device, wherein the control instruction is operative to direct the target prompt device to output prompt information based on the control instruction.

Communication interface 1003 is operative to transmit a control instruction to the target prompt device, wherein the control instruction is operative to direct the target prompt device to output prompt information based on the control instruction.

Internal bus 1004 is operative to couple each hardware component of the server 1000.

According to an example embodiment, the determining unit 1010 being executable by the one or more processors 1002 to cause the one or more processors 1002 to, after receiving an object seeking request transmitted by a client terminal, determine a target object corresponding to the object seeking request, includes: the determining unit 1010 being executable by the one or more processors 1002 to cause the one or more processors 1002 to, after receiving an object seeking request transmitted by a client terminal, extract object information input by the user into the client terminal from the object seeking request, then perform recognition on the object information, and determine a target object corresponding to the object information.

According to an example embodiment, the target object storage device includes multiple storage regions; and the determining unit 1010 being executable by the one or more processors 1002 to cause the one or more processors 1002 to determine the target prompt device corresponding to the location of the target object storage device includes: the determining unit 1010 being executable by the one or more processors 1002 to cause the one or more processors 1002 to determine the object storage region corresponding to the target object; and to determine the target prompt device corresponding to the location of the target storage region.

According to an example embodiment, the target prompt device is installed in space above the target storage device, the target prompt device including prompt units corresponding to storage regions; and the determining unit 1010 being executable by the one or more processors 1002 to cause the one or more processors 1002 to determine a target prompt device corresponding to the location of the target storage region includes: the determining unit 1010 being executable by the one or more processors 1002 to cause the one or more processors 1002 to determine the prompt unit corresponding to the target storage region as the target prompt device.

According to an example embodiment, a first prompt unit is installed in space above the target object storage device, and a second prompt unit is installed at the location of the target storage region; and the determining unit 1010 being executable by the one or more processors 1002 to cause the one or more processors 1002 to determine the target prompt device corresponding to the location of the target storage region includes: the determining unit 1010 being executable by the one or more processors 1002 to cause the one or more processors 1002 to determine the first prompt unit and the second prompt unit as target prompt units.

According to an example embodiment, the determining unit 1010 further causes the one or more processors 1002 to determine target prompt information corresponding to the target object storage device; and the transmitting unit 1011 being executable by the one or more processors 1002 to cause the communication interface 1003 to transmit the control instruction to the target prompt device includes: the transmitting unit 1011 being executable by the one or more processors 1002 to cause the communication interface 1003 to transmit the control instruction carrying the target prompt information to the target prompt device, the control instruction operative to direct the target prompt device to output the target prompt information.

According to an example embodiment, the transmitting unit 1011 further causes the communication interface 1003 to transmit the target prompt information to the client terminal.

According to an example embodiment, the determining unit 1010 further causes the one or more processors 1002 to determine a target location of the target object storage device in the region of space; and the transmitting unit 1011 further causes the communication interface 1003 to transmit the target location to the client terminal.

According to an example embodiment, the server 1000 further includes a navigating unit 1013 stored in the memory 1001 and executable by the one or more processors 1002 to cause the one or more processors 1002 to determine the starting location of the client terminal in the region of space, and generate a navigation route based on the starting location and the target location; and the transmitting unit 1011 further causes the communication interface to transmit the navigation route to the client terminal.

According to an example embodiment, the navigating unit 1013 further causes the one or more processors 1002 to determine the starting location of the client terminal in the region of space, determine navigation prompt devices encountered from the starting location to the target location, and control the navigation prompt device to perform navigation prompting.

An embodiment of the present application further discloses a computer readable storage medium, wherein the computer readable storage medium stores instructions which, when running on a computer, enable the computer to perform the processes described above.

The memory 1001 may include a form of computer readable media such as a volatile memory, a random access memory (RAM) and/or a non-volatile memory, for example, a read-only memory (ROM) or a flash RAM. The memory 1001 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 1001 may include program modules 1020 and program data 1022. The program modules 1020 may include one or more of the units as described in above.

Figure 11A:
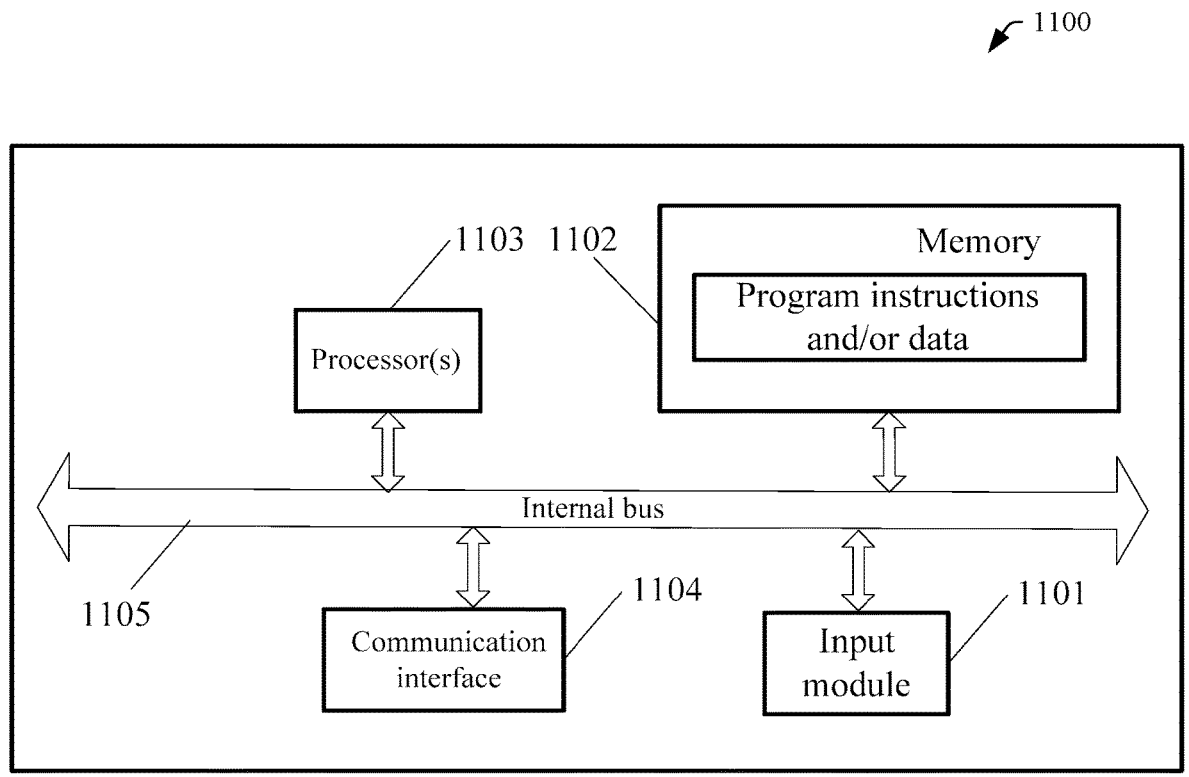
FIGS. 11A and 11B are diagrams of a structure of a client terminal according to an example embodiment of the present disclosure.
Figure 11B:
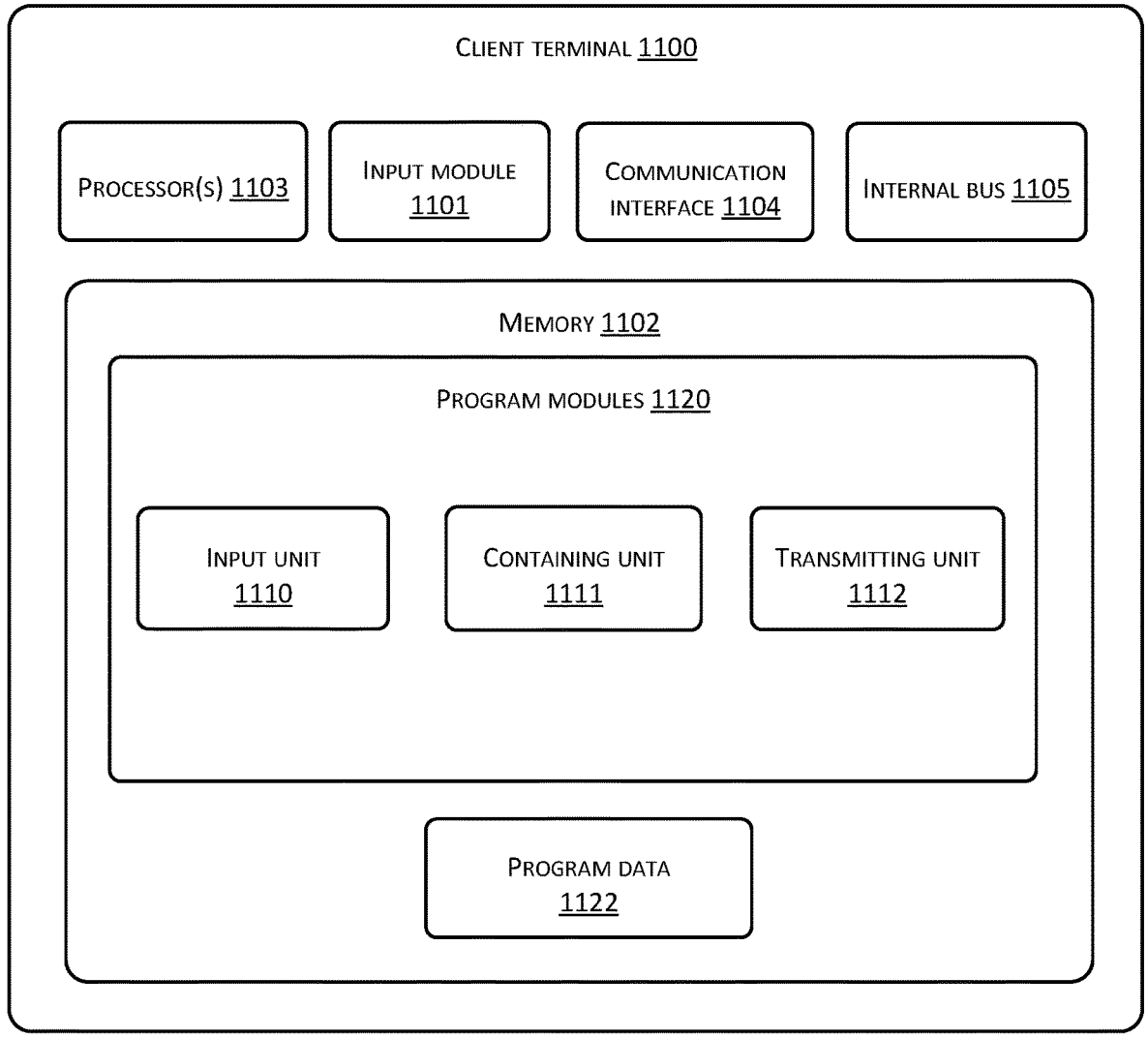

Referring to FIGS. 11A and 11B, a schematic of a client terminal 1100 of example embodiments of the present disclosure is illustrated. As illustrated by FIGS. 11A and 11B, the client terminal 1100 may in particular include: input module 1101, memory 1102, one or more processors 1103, communication interface 1104, and internal bus 1105. The client terminal 1100 may further include an input unit 1110, a containing unit 1111, and a transmitting unit 1112.

Input module 1101 is operative to receive object information input by a user, wherein the input module may be a touchscreen, voice input module, and such specific structures.

Memory 1102 is operative to store program instructions and/or data.

One or more processors 1103, through reading program instructions and/or data stored on memory 1102, is operative to execute processes as follows:

The input unit 1110 is stored in the memory 1102 and executable by the one or more processors 1103 to cause the input module 1101 to receive object information input by a user.

The containing unit 1111 is stored in the memory 1102 and executable by the one or more processors 1103 to cause the one or more processors 1103 to contain the object information in an object seeking request; wherein the object seeking request enables the server to: determine a target object corresponding to the object seeking request and a target object storage device corresponding to the target object; determine a target prompt device corresponding to the location of the target object storage device; and transmit a control instruction to the target prompt device, wherein the control instruction is operative to direct the target prompt device to output prompt information based on the control instruction.

The transmitting unit 1112 is stored in the memory 1102 and executable by the one or more processors 1103 to cause the communication interface 1104 to transmit the object seeking request to the server.

Communication interface 1104 is operative to transmit the object seeking request to the server.

Internal bus 1105 is operative to couple each hardware component of the client terminal.

According to an example embodiment, the input module 1101 is specifically a voice input module, such that the input unit 1110 being executable by the one or more processors 1002 to cause the input module 1101 to receive object information input by the user includes: the input unit 1110 being executable by the one or more processors 1002 to cause the input module 1101 to receive object information input in a voice format by the user through the voice module.

Figure 12A:
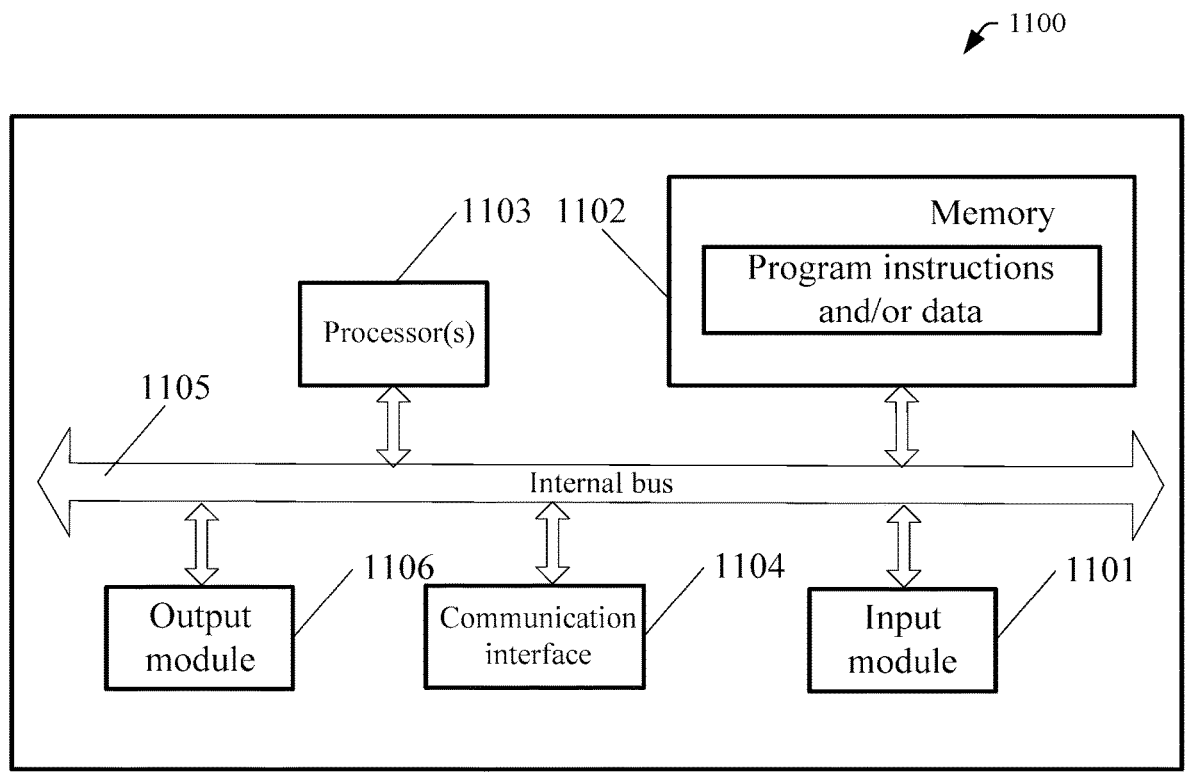
FIGS. 12A and 12B are diagrams of another structure of a client terminal according to an example embodiment of the present disclosure.
Figure 12B:
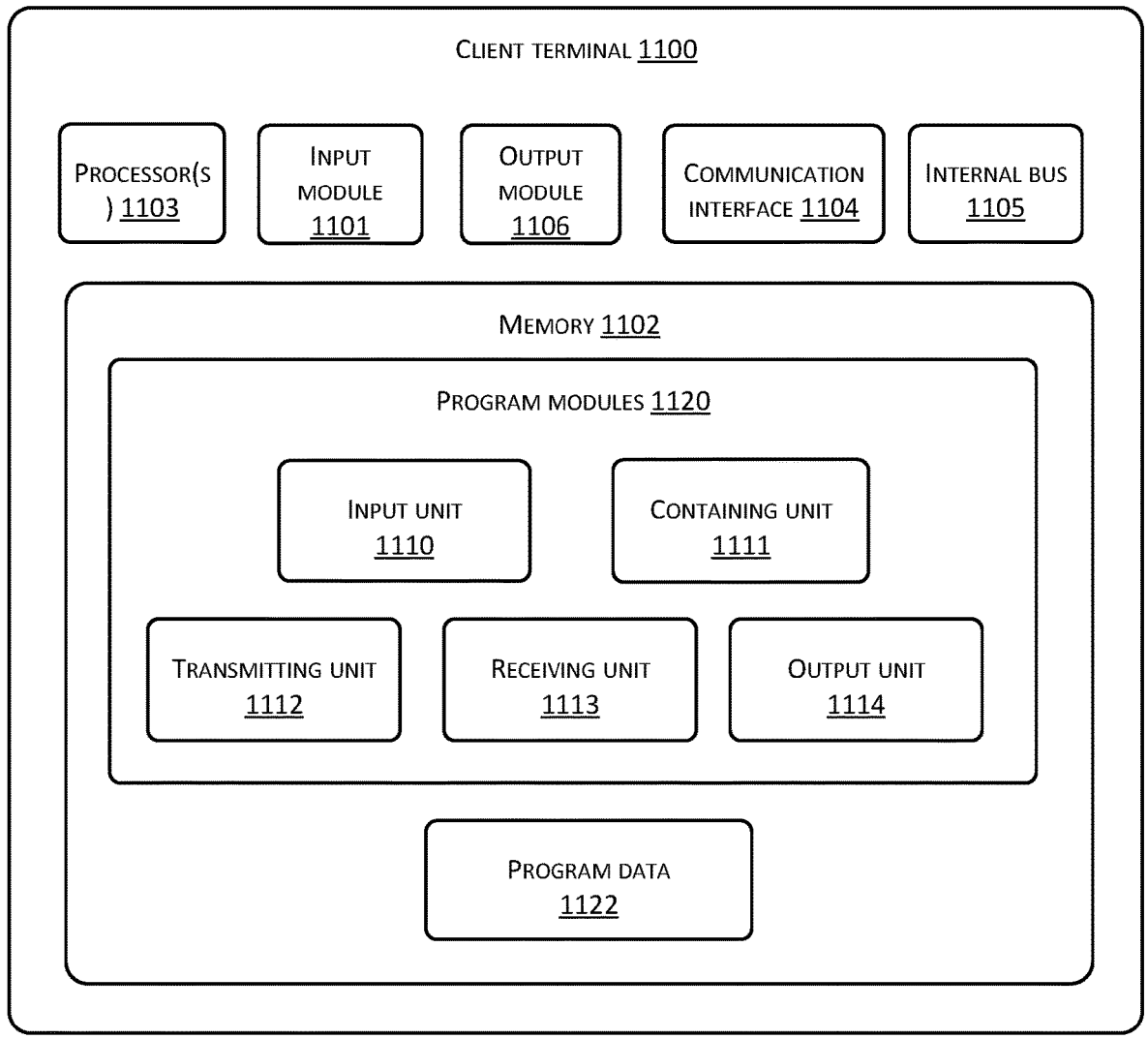

According to an example embodiment, the region of space where the target object storage device is present includes multiple object storage devices, prompt information corresponding to different object storage devices being different, such that: the client terminal 1100 further includes a receiving unit 1113 stored in the memory 1102 and executable by the one or more processors 1103 to cause the communication interface 1104 to receive the target prompt information corresponding to the target object storage device returned by the server. Correspondingly, FIGS. 12A and 12B illustrate a different client terminal structure, where the client terminal 1110 further includes output module 1106, and output unit 1114 stored in the memory 1102 and executable by the one or more processors 1103 to cause the output module 1106 to output the target prompt information. In particular, the output module 1106 may be a monitor, a voice output module, and such specific structures.

According to an example embodiment, the receiving unit 1113 further causes the communication interface 1104 to receive the target location of the target object storage device in the region of space returned by the server; correspondingly, the client terminal 1100 may include an output module, and output unit 1114 stored in the memory 1102 and executable by the one or more processors 1103 to cause the output module to output the target location.

According to an example embodiment, the receiving unit 1113 further causes the communication interface 1104 to receive a navigation route returned by the server, wherein the navigation route is operative to represent a route from the starting location of the client terminal 1100 to the target location; correspondingly, the client terminal 1100 further includes an output module, and output unit 1114 stored in the memory 1102 and executable by the one or more processors 1103 to cause the output module to output the navigation route.

An embodiment of the present application further discloses a computer readable storage medium, wherein the computer readable storage medium stores instructions which, when running on a computer, enable the computer to perform the processes described above.

The memory 1102 may include a form of computer readable media such as a volatile memory, a random access memory (RAM) and/or a non-volatile memory, for example, a read-only memory (ROM) or a flash RAM. The memory 1102 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 1102 may include program modules 1120 and program data 1122. The program modules 1120 may include one or more of the units as described in above.

Additionally, the present disclosure provides an object locating system, including: a server, an object storage device, and a prompting device. Herein:

The object storage device is operative to store objects.

The server is operative to, after receiving an object seeking request transmitted by a client terminal, determine a target object corresponding to the object seeking request and an object storage device corresponding to the target object; determine a prompt device corresponding to the location of the object storage device; and transmit control instructions to the prompt device.

The prompt device is installed in a location corresponding to the object storage device, and operative to output prompt information based on the control instructions.

The example embodiments in this specification are described progressively, each example embodiment emphasizes a part different from other example embodiments, and identical or similar parts of the example embodiments may be obtained with reference to each other.

In this specification, relationship terms such as "first," "second," and the like are merely used to distinguish a one entity or operation from another entity or operation, and do not necessarily require or imply that such an actual relationship or ordering exists between these entities or operations. Furthermore, the terms "include," "including," or any other variations thereof are intended to cover non-exclusive inclusions, such that the inclusion of a series of elements in a process, method, article, or apparatus includes not only those elements, but also includes other elements not explicitly listed, or include elements that are inherent to such processes, methods, article, or apparatus. Where no further limitation is given, an element defined by the phrase "includes a . . . " does not exclude the existence of another identical element in the process, method, article, or apparatus including the element.

With regard to the example embodiments disclosed above, persons skilled in the art are able to implement or use the present disclosure. With regard to various modifications to the example embodiments that would be obvious to persons skilled in the art, general principles defined in the present specification may, where it does not deviate from the spirit or scope of the present disclosure, be implemented in other example embodiments. The present disclosure shall not be limited to the example embodiments of the present text, but shall be accorded the broadest scope that satisfies the principles and points of novelty of the present specification.

The present disclosure may further be understood with clauses as follows.

Clause 1. An object locating method, comprising:

determining, after receiving an object seeking request transmitted from a client terminal, a target object corresponding to the object seeking request and a target object storage device corresponding to the target object;

determining a target prompt device corresponding to the location of the target object storage device; and transmitting a control instruction to the target prompt device, the control instruction operative to direct the target prompt device to output prompt information based on the control instruction.

Clause 2. The object locating method of clause 1, wherein determining, after receiving an object seeking request transmitted from a client terminal, a target object corresponding to the object seeking request and a target object storage device corresponding to the target object comprises:

after receiving the object seeking request transmitted from the client terminal, extracting object information input at the client terminal by the user from the object seeking request; and performing recognition upon the object information and determining a target object corresponding to the object information.

Clause 3. The object locating method of clause 1, wherein the target object storage device comprises a plurality of storage regions; and wherein determining a target prompt device corresponding to the location of the target object storage device comprises:

determining a target storage region corresponding to the target object; and determining a target prompt device corresponding to the location of the target storage region.

Clause 4. The object locating method of clause 3, wherein the target prompt device is set up within space above the target object storage device, the target prompt device comprising a prompt unit corresponding to the storage region; and wherein determining a target prompt device corresponding to the location of the target storage region comprises determining the prompt unit corresponding to the target storage region as the target prompt device.

Clause 5. The object locating method of clause 3, wherein a first prompt unit is set up within space above the target object storage device, and a second prompt unit is set up at the location where the target storage region is present; and wherein determining a target prompt device corresponding to the location of the target storage region comprises determining the first prompt unit and the second prompt unit as target prompt devices.

Clause 6. The object locating method of clause 1, wherein transmitting a control instruction to the target prompt device comprises:

determining target prompt information corresponding to the target object storage device; and transmitting a control instruction containing the target prompt information to the target prompt device, the control instruction operative to direct the target prompt device to output the target prompt information.

Clause 7. The object locating method of clause 6, further comprising transmitting the target prompt information to the client terminal.

Clause 8. The object locating method of clause 1, further comprising:

determining a target location of the target object storage device in a region of space; and transmitting the target location to the client terminal.

Clause 9. The object locating method of clause 8, further comprising:

determining a starting location of the client terminal within the region of space, and generating a navigation route based on the starting location and the target location; and transmitting the navigation route to the client terminal.

Clause 10. The object locating method of clause 8, further comprising:

determining a starting location of the client terminal within the region of space, and determining a navigation prompt device encountered from the starting location to the target location; and controlling the navigation prompt device to perform navigation prompting.

Clause 11. The object locating method of clause 1, wherein the target prompt device is set up within a region of space; and wherein the prompt information comprises prompt information visible to a user within an effective region of the region of space.

Clause 12. An object locating method, comprising:

receiving object information input by a user;

transmitting the object information contained in an object seeking request to a server, the object seeking request causing the server to:

determine a target object corresponding to the object seeking request and a target object storage device corresponding to the target object;

determine a target prompt device corresponding to the location of the target object storage device; and transmit a control instruction to the target prompt device, the control instruction operative to direct the target prompt device to output prompt information based on the control instruction.

Clause 13. The object locating method of clause 12, wherein receiving object information input by a user comprises receiving object information in a voice format input by the user through a voice module.

Clause 14. The object locating method of clause 12, wherein a region of space where the target object storage device is present includes a plurality of object storage devices, different prompt information corresponding to different object storage devices; and further comprising:

receiving target prompt information corresponding to the target object storage device returned by the server; and outputting the target prompt information.

Clause 15. The object locating method of clause 12, further comprising:

receiving a target location of the target object storage device in the region of space returned by the server; and outputting the target location.

Clause 16. The object locating method of clause 15, further comprising:

receiving a navigation route returned by the server, the navigation route operative to represent a route of the client terminal from a starting location to the target location; and outputting the navigation route.

Clause 17. A server comprising:

a processor operative to, after receiving an object seeking request transmitted by a client terminal, determine a target object corresponding to the object seeking request and a target object storage device corresponding to the target object, and determine a target prompt device corresponding to the location of the target object storage device; and a communication interface operative to transmit a control instruction to the target prompt device, the control instruction operative to direct the target prompt device to output prompt information based on the control instruction.

Clause 18. The server of clause 17, wherein the processor being operative to, after receiving an object seeking request transmitted by a client terminal, determine a target object corresponding to the object seeking request, comprises:

the processor, after receiving an object seeking request transmitted by a client terminal, extracting object information input by the user into the client terminal from the object seeking request, performing recognition upon the object information, and determining a target object corresponding to the object information.

Clause 19. The server of clause 17, wherein the target object storage device comprises a plurality of storage regions; and wherein the processor being operative to determine the target prompt device corresponding to the location of the target object storage device comprises:

the processor being operative to determine a target storage region corresponding to the target object, and to determine a target prompt device corresponding to the location of the target storage region.

Clause 20. The server of clause 19, wherein the target prompt device is set up in space above the target object storage device, and the target prompt device comprises prompt units corresponding to storage regions; and the processor being operative to determine the target prompt device corresponding to the location of the target storage region comprises:

the processor being operative to determine the prompt unit corresponding to the target storage region as the target prompt device.

Clause 21. The server of clause 19, wherein a first prompt unit is set up in space above the target object storage device, and a second prompt unit is set up at the location where the target storage region is present; and the server being operative to determine a target prompt device corresponding to the location of the target storage region comprises the server being operative to determine the first prompt unit and the second prompt unit as target prompt devices.

Clause 22. The server of clause 17, wherein:

the processor is further operative to determine target prompt information corresponding to the target object storage device; and the communication interface being operative to transmit control instructions to the target prompt device comprises the communication interface being operative to transmit control instructions carrying the target prompt information to the target prompt device, the control instructions operative to direct the target prompt device to output the target prompt information.

Clause 23. The server of clause 22, wherein the communication interface is further operative to transmit the target prompt information to the client terminal.

Clause 24. The server of clause 17, wherein the processor is further operative to determine a target location of the target object storage device in the region of space; and wherein the communication interface is further operative to transmit the target location to the client terminal.

Clause 25. The server of clause 24, wherein the processor is further operative to determine a starting location of the client terminal in the region of space, and generate a navigation route based on the starting location and the target location; and wherein the communication interface is further operative to transmit the navigation route to the client terminal.

Clause 26. The server of clause 24, wherein the processor is further operative to determine the starting location of the client terminal in the region of space, determine navigation prompt devices encountered from the starting location to the target location, and control the navigation prompt devices to perform navigation prompting.

Clause 27. A client terminal comprising:

an input module operative to receive object information input by a user;

a processor operative to contain the object information in an object seeking request; and a communication interface operative to transmit the object seeking request to a server, the object seeking request causing the server to:

determine a target object corresponding to the object seeking request and a target object storage device corresponding to the target object;

determine a target prompt device corresponding to the location of the target object storage device; and transmit a control instruction to the target prompt device, the control instruction operative to direct the target prompt device to output prompt information based on the control instruction.

Clause 28. The client terminal of clause 27, wherein the input module being operative to receive object information input by the user comprises the input module being operative to receive object information input by the user in a voice format through a voice module.

Clause 29. The client terminal of clause 27, wherein the region of space where the target object storage device is present includes a plurality of object storage devices, prompt information corresponding to different object storage devices being different;

wherein the communication interface is further operative to receive target prompt information corresponding to the target object storage device returned by the server; and wherein the client terminal further comprises an output module operative to output the target prompt information.

Clause 30. The client terminal of clause 27, wherein the communication interface is further operative to receive a target location of the target object storage in the region of space returned by the server; and wherein the client terminal further comprises an output module operative to output the target location.

Clause 31. The client terminal of clause 30, wherein the communication interface is further operative to receive a navigation route returned by the serer, the navigation route operative to represent a route from a starting location of the client terminal to the target location; and wherein the client terminal further comprises an output module operative to output the navigation route.

Clause 32. An object locating room, comprising an object storage device and a prompt device;

wherein the object storage device is operative to store objects; and wherein the prompt device is set up in space above the object storage device and operative to output prompt information based on a control instruction.

Clause 33. An object locating room, comprising an object storage device and a prompt device;

wherein the object storage device is operative to store objects; and wherein the prompt device is set up on interior surfaces of the object locating room in a region corresponding to the location of the object storage device, and operative to output prompt information based on a control instruction.

Clause 34. An object locating system, comprising a server, an object storage device, and a prompt device;
wherein the object storage device is operative to store objects;
wherein the server is operative to, after receiving an object seeking request transmitted by a client terminal, determine a target object corresponding to the object seeking request and an object storage device corresponding to the target object; determine a prompt device corresponding to the location of the object storage device; and transmit a control instruction to the prompt device; and
wherein the prompt device is set up in a location corresponding to the object storage device, and operative to output prompt information based on the control instruction.

What is claimed is:

1. A method, comprising:
   determining, after receiving an object seeking request transmitted from a client terminal, a target object corresponding to the object seeking request;
   identifying a target object storage device corresponding to the target object from a plurality of object storage devices, wherein the target object storage device comprises a plurality of storage regions;
   identifying a target object storage region in which the target object is present from the plurality of storage regions of the target object storage device;
   determining a first target prompt device indicating a location of the target object storage device from a plurality of first prompt devices;
   determining a second target prompt device indicating a location of the target object storage region of the target object storage device from a plurality of second prompt devices that are configured to indicate corresponding locations of a plurality of storage regions of the target object storage device, at least one second prompt device being located at each storage region of the plurality of storage regions of the target object storage device, wherein the plurality of second target prompt devices are configured to output different prompt information and are placed above the target object storage device; and
   transmitting a control instruction to the first target prompt device and the second target prompt device, the control instruction operative to direct the first target prompt device and the second target prompt device to output target prompt information based on the control instruction, the target prompt information enabling a user of the client terminal to distinguish the second target prompt device from other second prompt devices of the plurality of second prompt devices when multiple second prompt devices output respective prompt information at a same time.

2. The method of claim 1, wherein determining, after receiving the object seeking request transmitted from the client terminal, the target object corresponding to the object seeking request, identifying the target object storage device corresponding to the target object comprises:
   after receiving the object seeking request transmitted from the client terminal, extracting object information input at the client terminal by a user from the object seeking request; and
   performing recognition upon the object information and determining the target object based on the object information.

3. The method of claim 1, wherein the first target prompt device is set up within space above the target object storage device.

4. The method of claim 1, further comprising:
   determining first target prompt information corresponding to the target object storage device; and
   determining second target prompt information corresponding to the target object storage region in the target object storage device, wherein the control instruction comprises the first target prompt information, and the control instruction is operative to direct the first target prompt device to output the first target prompt information and the second target prompt device to output the second target prompt information.

5. The method of claim 1, further comprising:
   determining a target location of the target object storage device in a region of space; and
   transmitting the target location to the client terminal.

6. The method of claim 5, further comprising:
   determining a starting location of the client terminal within the region of space, and generating a navigation route based on the starting location and the target location; and
   transmitting the navigation route to the client terminal.

7. The method of claim 5, further comprising:
   determining a starting location of the client terminal within the region of space, and determining a navigation prompt device encountered from the starting location to the target location; and
   controlling the navigation prompt device to perform navigation prompting.

8. A method, comprising:
   receiving object information input by a user;
   transmitting the object information contained in an object seeking request to a server, the object seeking request causing the server to:
      determine a target object corresponding to the object seeking request;
      identify a target object storage device corresponding to the target object from a plurality of object storage devices, wherein the object storage device comprises a plurality of storage regions;
      identify a target object storage region in which the target object is present from the plurality of storage regions of the target object storage device;
      determine a first target prompt device indicating a location of the target object storage device from a plurality of first prompt devices;
      determine a second target prompt device indicating a location of the target object storage region of the target object storage device from a plurality of second prompt devices, wherein the plurality of second target prompt devices are configured to output different prompt information and are placed above the target object storage device; and
      transmit a control instruction to the first target prompt device and the second target prompt device, the control instruction operative to direct the first target prompt device and the second target prompt device to output target prompt information based on the control instruction, the target prompt information enabling a user of the client terminal to distinguish the second target prompt device from other second prompt devices of the plurality of second prompt devices when multiple second prompt devices output respective prompt information.

9. A server comprising:
one or more processors;
memory;
a communication interface;

a determining unit stored in the memory and executable by the one or more processors to cause the one or more processors to:
   after receiving an object seeking request transmitted by a client terminal, determine a target object corresponding to the object seeking request,
   identify a target object storage device corresponding to the target object from a plurality of object storage devices, wherein the object storage device comprises a plurality of storage regions,
   identify a target object storage region in which the target object is present from the plurality of storage regions of the target object storage device,
   determine a first target prompt device indicating a location of the target object storage device from a plurality of first prompt devices, and
   determine a second target prompt device indicating a location of the target object storage region relative to the target object storage device from a plurality of second prompt devices, wherein the plurality of second target prompt devices are configured to output different prompt information and are placed above the target object storage device; and
a transmitting unit stored in the memory and executable by the one or more processors to cause the communication interface to transmit a control instruction to the first target prompt device and the second target prompt device, the control instruction operative to direct the first target prompt device and the second target prompt device to output target prompt information based on the control instruction, the target prompt information enabling a user of the client terminal to distinguish the second target prompt device from other second prompt devices of the plurality of second prompt devices when multiple second prompt devices output respective prompt information.

10. The server of claim 9, wherein the determining unit is further executable by the one or more processors to cause the one or more processors to, after receiving an object seeking request transmitted by a client terminal, extract object information input by a user into the client terminal from the object seeking request, perform recognition upon the object information, and determine the target object c based on the object information.

11. The server of claim 9, wherein the first target prompt device is set up in space above the target object storage device.

12. The server of claim 9, wherein:
the determining unit is further executable by the one or more processors to cause the one or more processors to determine first target prompt information corresponding to the target object storage device and second target prompt information corresponding to the target storage region, the control instruction operative to direct the first target prompt device to output the first target prompt information and the second target prompt device to output the second target prompt information.

13. The server of claim 9, wherein the determining unit is further executable by the one or more processors to cause the one or more processors to determine a target location of the target object storage device in a region of space; and
   wherein the transmitting unit is further executable by the one or more processors to cause the communication interface to transmit the target location to the client terminal.

14. The server of claim 13, wherein the determining unit is further executable by the one or more processors to cause the one or more processors to determine a starting location of the client terminal in the region of space, and generate a navigation route based on the starting location and the target location; and
   wherein the transmitting unit is further executable by the one or more processors to cause the communication interface to transmit the navigation route to the client terminal.

15. A system comprising:
a plurality of object storage devices, each object storage device comprising a plurality of storage regions;
a plurality of first prompt devices to indicate respective locations of the plurality of object storage devices; and
a plurality of second prompt devices to indicate respective locations of the plurality of storage regions of each object storage device, the plurality of second target prompt devices being configured to output different prompt information and placed above the respective object storage device, wherein:
the plurality of object storage devices are operative to store objects,
the plurality of first prompt devices and the plurality of second prompt devices are set up in space above the plurality of object storage devices, and
at least one of the plurality of first prompt devices is operative to output first prompt information and at least one of the plurality of second prompt devices is operative to output second prompt information in response to a control instruction, the second prompt information enabling a user of the client terminal to distinguish the second target prompt device from other second prompt devices of the plurality of second prompt devices when multiple second prompt devices output respective prompt information.

16. The system of claim 15, wherein
the first target prompt information indicates a location of a target object storage device in an object locating room, and
the second target prompt information indicates a location of a target storage region relative to the corresponding target storage device.

17. A system comprising:
a plurality of object storage devices, each object storage device comprising a plurality of storage regions;
a plurality of first prompt devices to indicate respective locations of the plurality of object storage devices; and
a plurality of second prompt devices to indicate respective locations of the plurality of storage regions of each object storage device, the plurality of second target prompt devices being configured to output different prompt information and placed above the respective object storage device, wherein:
the plurality of object storage devices are operative to store objects,
each first prompt device of the plurality of first prompt devices is set up on interior surfaces of an object locating room in a region corresponding to a location of a corresponding object storage device,
each of the plurality of second prompt devices is set up at a location of a corresponding object storage region, and
at least one of the plurality of first prompt devices is operative to output first prompt information and at least one of the plurality of second prompt devices is operative to output second prompt information in response to a control instruction, the second prompt information enabling a user of the client terminal to distinguish the second target prompt device from other second prompt devices of the plurality of second prompt devices when multiple second prompt devices output respective prompt information.

18. The system of claim 17, wherein
the first target prompt information indicates a location of a target object storage device in the object locating room, and
the second target prompt information indicates a location of a target storage region of the target storage device.

* * * * *